(12) United States Patent
Nakahara et al.

(10) Patent No.: US 7,715,564 B2
(45) Date of Patent: May 11, 2010

(54) LICENSE INFORMATION CONVERSION APPARATUS

(75) Inventors: Tohru Nakahara, Osaka (JP); Akio Higashi, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1752 days.

(21) Appl. No.: 10/212,068

(22) Filed: Aug. 6, 2002

(65) Prior Publication Data

US 2003/0048907 A1 Mar. 13, 2003

(30) Foreign Application Priority Data

Aug. 8, 2001 (JP) .............................. 2001-241095

(51) Int. Cl.
*H04L 9/00* (2006.01)
(52) U.S. Cl. .............................. 380/277; 705/59; 726/2; 726/31
(58) Field of Classification Search ...................... 713/1, 713/2, 188, 194; 380/200, 201, 255, 277; 176/2; 813/188, 194; 726/2, 4–7, 26–27, 726/31–33; 705/59
See application file for complete search history.

(56) References Cited

U.S. PATENT DOCUMENTS

| | | | | |
|---|---|---|---|---|
| 5,119,465 | A * | 6/1992 | Jack et al. ................... | 717/137 |
| 6,070,964 | A * | 6/2000 | Sumiya ........................ | 347/43 |
| 6,539,432 | B1 * | 3/2003 | Taguchi et al. .............. | 709/227 |
| 6,820,063 | B1 * | 11/2004 | England et al. ............... | 705/54 |
| 6,996,533 | B2 * | 2/2006 | Ikeda et al. ............... | 704/270.1 |
| 6,999,948 | B1 | 2/2006 | Hatanaka et al. | |
| 2001/0056398 | A1 * | 12/2001 | Scheirer ....................... | 705/38 |
| 2002/0035723 | A1 | 3/2002 | Inoue | |
| 2003/0014630 | A1 * | 1/2003 | Spencer et al. .............. | 713/168 |

| | | |
|---|---|---|
| 2006/0116969 A1 | 6/2006 | Hatanaka et al. |

FOREIGN PATENT DOCUMENTS

| | | |
|---|---|---|
| CA | 2 356 343 | 5/2001 |
| EP | 0 268 139 | 5/1988 |
| EP | 0 864 959 | 9/1998 |
| EP | 1 045 388 | 10/2000 |
| EP | 1 120 967 | 8/2001 |
| EP | 1 158 416 | 11/2001 |

(Continued)

OTHER PUBLICATIONS

European Search Report dated Mar. 27, 2009 for European Application No. 09000394.8.

(Continued)

*Primary Examiner*—Kimyen Vu
*Assistant Examiner*—Joseph Pan
(74) *Attorney, Agent, or Firm*—Wenderoth, Lind & Ponack, L.L.P.

(57) ABSTRACT

Each of at least two terminal apparatuses uses content data in accordance with license information which is generated by a content distribution system to which it subscribes. A conversion apparatus includes a working area for storing license information which is compatible with one of the terminal apparatuses, and a central processing section for converting the license information stored in the working area into license information which is compatible with the other terminal apparatus. Thus, there is provided a conversion apparatus which can convert one's own license information so as to be passable to others.

6 Claims, 24 Drawing Sheets

FOREIGN PATENT DOCUMENTS

| | | |
|---|---|---|
| EP | 1 209 657 | 5/2002 |
| JP | 5-274275 | 10/1993 |
| JP | 2000-242564 | 9/2000 |
| JP | 2000-347638 | 12/2000 |
| JP | 2001-067787 | 3/2001 |
| JP | 2001-209312 | 8/2001 |
| JP | 2001-211162 | 8/2001 |
| WO | 00/67257 | 11/2000 |
| WO | 01/13358 | 2/2001 |
| WO | 01/35236 | 5/2001 |

OTHER PUBLICATIONS

Supplementary European Search Report issued Nov. 3, 2008 for European Application No. 02755844.4.

* cited by examiner

F I G. 1
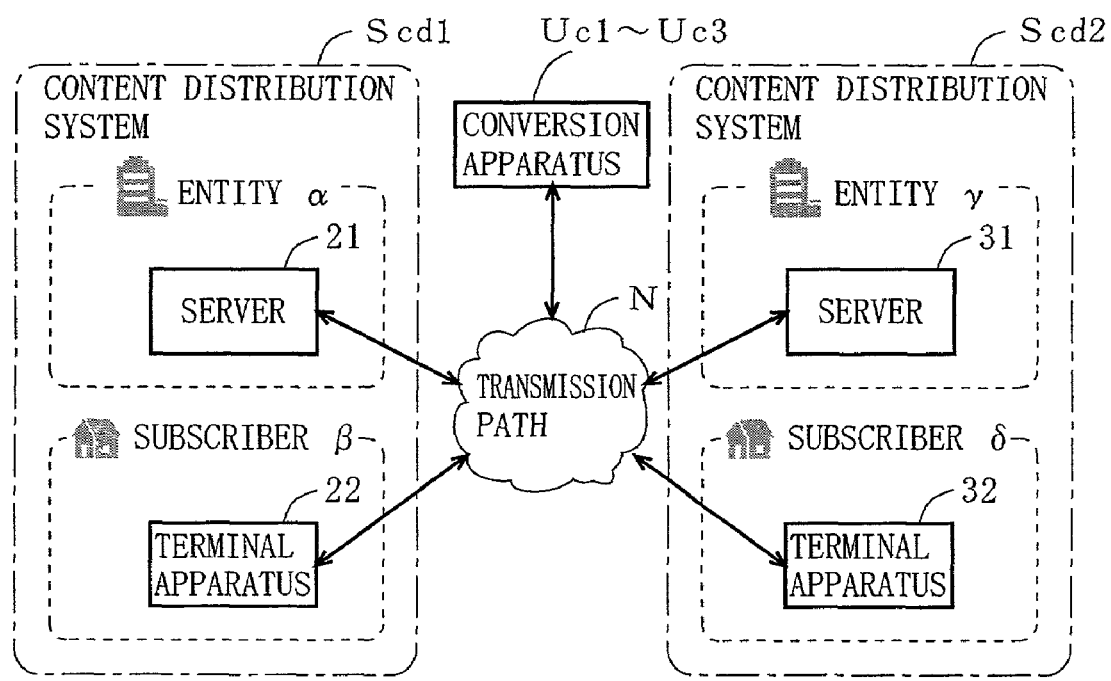

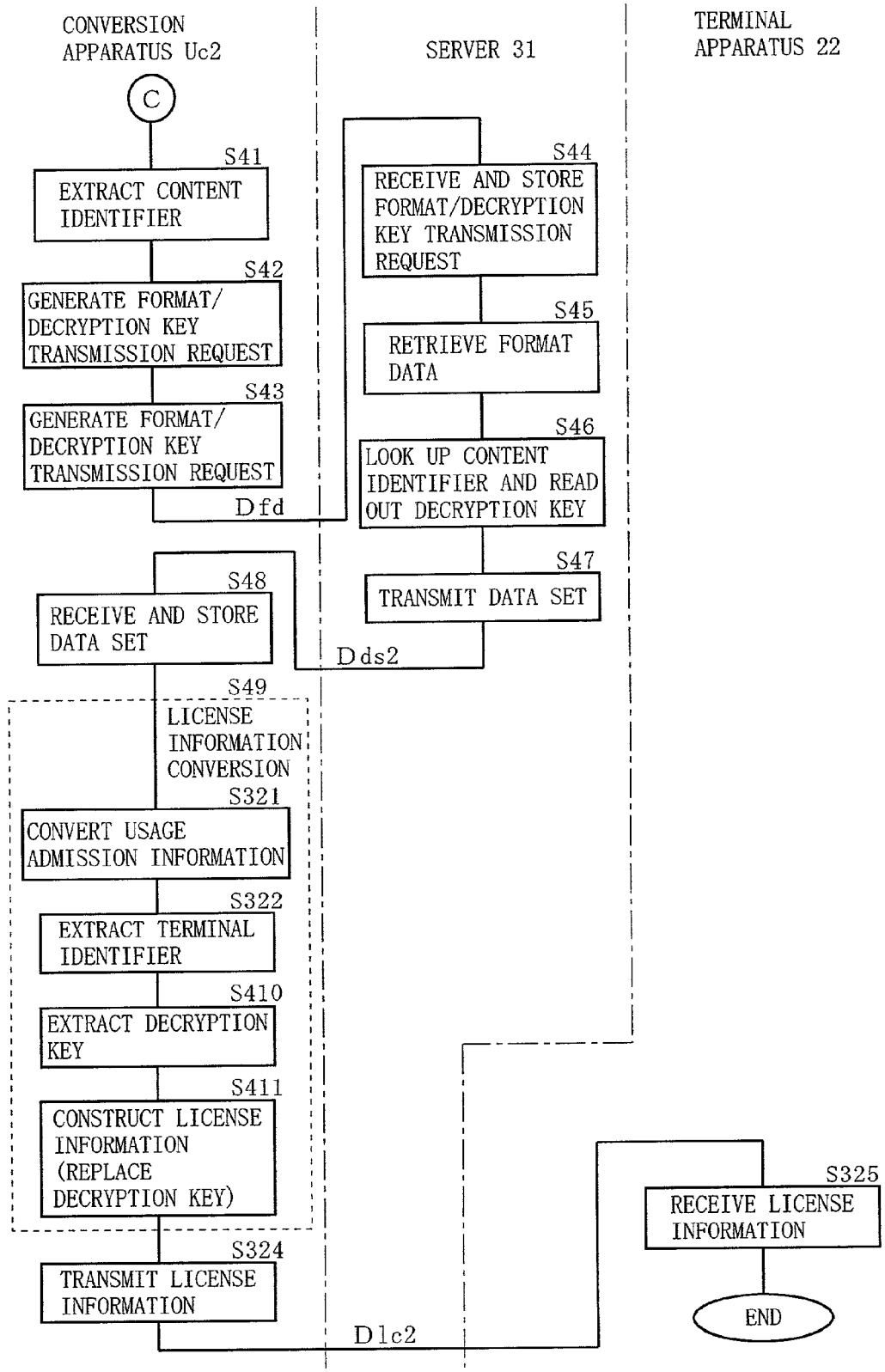

F I G. 2 2
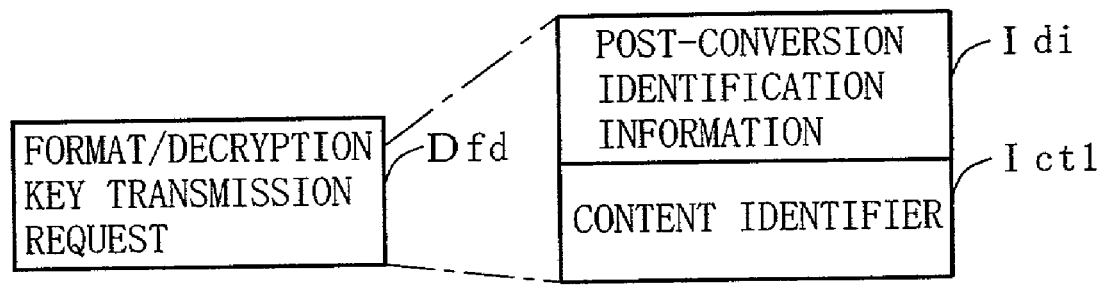

LICENSE INFORMATION CONVERSION APPARATUS

BACKGROUND OF THE INVENTION

1. Field of the Invention

The present invention relates to a conversion apparatus, and more particularly to a conversion apparatus for converting license information, which controls use of content data in a terminal apparatus.

2. Description of the Background Art

In recent years, content distribution has been familiarized by broadband networks such as the Internet and flat-rate connection environments. Since protection of rights concerning content data (e.g., copyrights or sales rights) is vital to a further prevalence of such content distribution, various right management technologies have conventionally been researched and developed. In the present specification, any rights concerning content data will be referred to as "digital rights". A representative right management technology is DRM (Digital Rights Management). Hereinafter, a content distribution system incorporating DRM will be described.

To a conventional content distribution system, a server and terminal apparatuses are coupled so as to be capable of data communications via a network. The server stores at least one set of content data, a content decryption key, and license information. The content data, which may be digital data representing music, for example, is encrypted by a predetermined scheme. The content decryption key is a key for decrypting encrypted content data. In the case of DRM, the license information represents usage rules for the content data. A typical example of a usage rule is a number of times of using the content data.

In a content distribution system having the above structure, content data is distributed as follows. First, a terminal apparatus requests the server to distribute content data. In general, a request for content data is made by a terminal apparatus transmitting a content identifier and terminal-specific information to the server via the network. The content identifier is information which uniquely identifies the content data. The terminal-specific information, which is previously retained in the terminal apparatus, is information which can uniquely identify the terminal apparatus which has made the request for the content data.

In response to the request from the terminal apparatus, the server encrypts the content decryption key by using the currently-received terminal-specific information. Thereafter, the server transmits the encrypted content data, the content decryption key which has been encrypted with the terminal-specific information, and the license information to the terminal apparatus. The terminal apparatus receives the content data, the content decryption key, and the license information which have been distributed from the server, and stores them in an internal memory device.

After storing the above, the currently-decrypted content data becomes usable to the user of the terminal apparatus. When actually using the content data, the user so instructs the terminal apparatus. In response to this instruction, the terminal apparatus operates as follows. The terminal apparatus determines whether or not the current use complies with a usage rule represented by the license information within the memory device. The terminal apparatus performs the subsequent processes only when the usage rule is complied with. Next, since the content decryption key within the memory device is encrypted, the terminal apparatus decrypts the content decryption key by using the terminal-specific information retained therein. Furthermore, since the content data within the memory device is also encrypted as described above, the terminal apparatus decrypts the content data by using the decrypted content decryption key, and thereafter reproduces the decrypted content data.

Next, the problems of the above-described content distribution system will be described. The user of the terminal apparatus (hereinafter referred to as the first user) may desire to pass his or her own license information, i.e., a license for content data, over to another user (hereinafter referred to as the second user). However, the second user may not necessarily be subscribing to the aforementioned content distribution system, and may be subscribing to another content distribution system. Furthermore, the structure of the license information may differ between the two content distribution systems. As a result, even if the second user's the terminal apparatus can receive the license information from the first user's terminal apparatus, it cannot interpret the received license information. Therefore, under the conventional content distribution system, it is impossible to pass one's own license information over to others.

Moreover, a user may be subscribing to different first and second content distribution systems, and may possess a first terminal apparatus which can only interpret license information obtained from the first content distribution system and a second terminal apparatus which can only interpret license information obtained from the second content distribution system. In such a situation, as described above, the structure of the license information used may differ between the first and second content distribution systems. Therefore, even if the second terminal apparatus can receive the license information from the first content distribution system, the second terminal apparatus cannot interpret it. Therefore, in the above situation, it may be possible that the license information owned by a user cannot be utilized on his or her own terminal apparatus.

SUMMARY OF THE INVENTION

Therefore, an object of the present invention is to provide a conversion apparatus which converts license information so that it can be utilized by another, or so that it can be utilized on another terminal apparatus. In order to attain the above object, the present invention is directed to a conversion apparatus for converting license information which is compatible with a first terminal apparatus into that which is compatible with a second terminal apparatus, wherein the first and second terminal apparatuses use content data in accordance with first and second license information which are different from each other. The conversion apparatus comprises: a working area for storing first license information compatible with the first terminal apparatus, and a processing section for converting the first license information stored in the working area into second license information compatible with the second terminal apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram illustrating conversion apparatuses Uc1 to Uc3 according to first to third embodiments of the present invention and respective peripheral environments thereof.

FIG. 21 is a flowchart illustrating a latter half of a process which is performed by the conversion apparatus Uc2 according to the second embodiment of the present invention after receiving a conversion request Ocr, during a license conversion process.

FIG. 22 is a diagram illustrating a format/decryption key transmission request Dfd, which is generated at step S42 in FIG. 20.

DESCRIPTION OF THE PREFERRED EMBODIMENTS

First Embodiment

FIG. 1 is a block diagram illustrating a conversion apparatus Uc1 according to a first embodiment of the present invention and the peripheral environments thereof. Referring to FIG. 1, the conversion apparatus Uc1 is coupled to content distribution systems Scd1 and Scd2 via a wired or wireless transmission path N, in a manner capable of data communications. To the content distribution system Scd1, at least one server 21 and at least one terminal apparatus 22 are coupled in a manner capable of data communications via the transmission path N. The server 21 is installed at an entity α, which is engaged in music distribution as an example of content distribution. The terminal apparatus 22 is installed at a subscriber β, who enjoys music distribution based on an agreement with the entity α. Moreover, at least one server 31 and at least one terminal apparatus 32 are coupled to the content distribution system Scd2 in a manner capable of data communications via the transmission path N. The server 31 is installed at an entity γ, which is engaged in music distribution as an example of content distribution. The terminal apparatus 32 is installed at a subscriber δ, who enjoys music distribution based on an agreement with the entity γ. In order to facilitate the understanding of the description, the present embodiment assumes that the entity γ is different from the entity α, and that the subscriber δ is different from subscriber β. However, the subscriber β may be the same person as the subscriber δ. In other words, the conversion apparatus Uc1 according to the present embodiment is applicable in the case where a single user who is at once the subscriber β and the subscriber δ is subscribing to both of the different content distribution systems Scd1 and Scd2 and possesses both the terminal apparatus 22 and the terminal apparatus 32.

Hereinafter, the detailed structure of the content distribution systems Scd1 and Scd2 and then the conversion apparatus Uc1 will be described.

Figure 2:
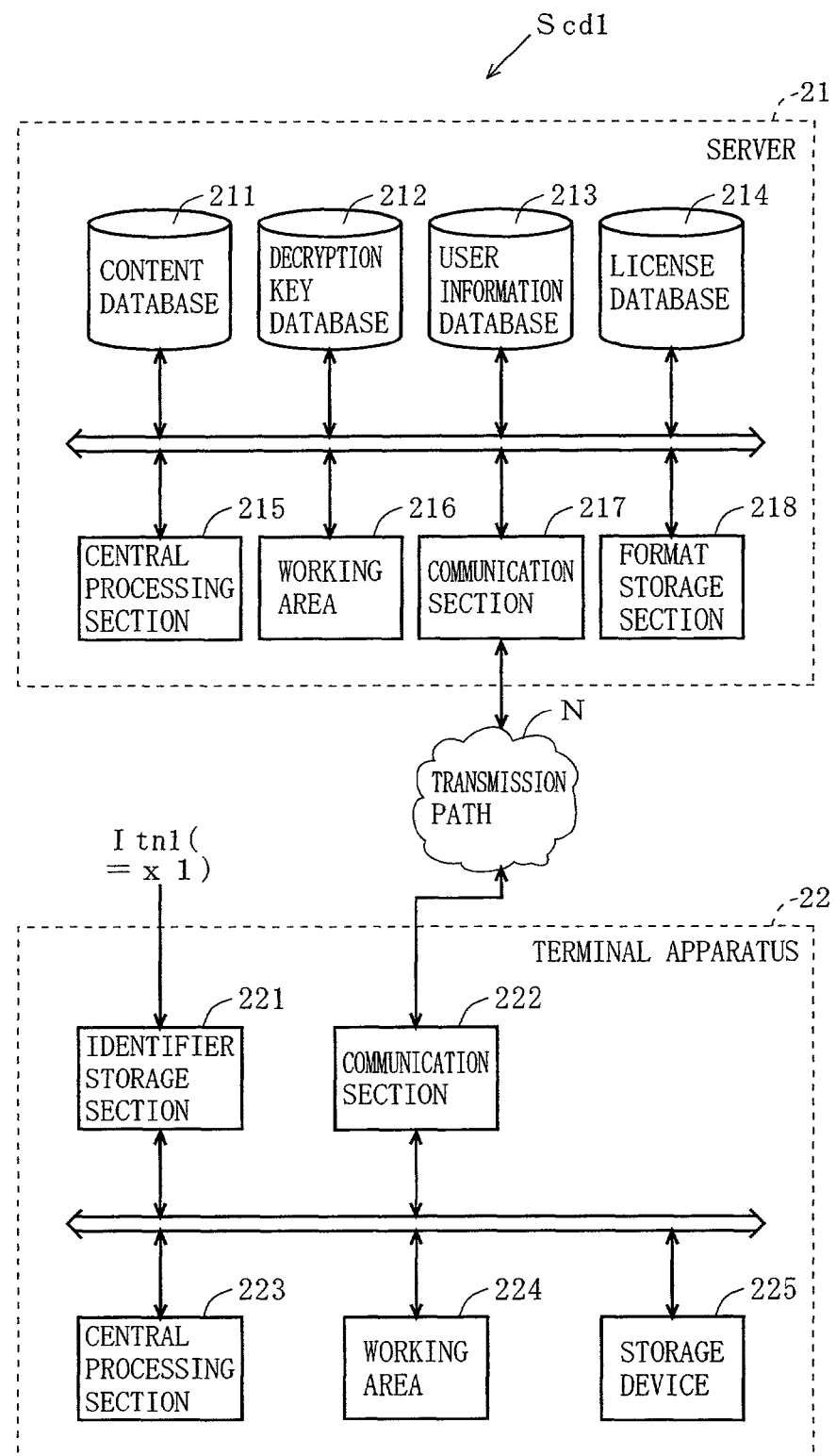
FIG. 2 is a block diagram illustrating the detailed structure of a server 21 and a terminal apparatus 22 in FIG. 1.

FIG. 2 is a block diagram illustrating the detailed structure of the server 21 and the terminal apparatus 22 in FIG. 1. Referring to FIG. 2, the server 21 comprises a content database (hereinafter referred to as a content DB) 211, a decryption key database (hereinafter referred to as a decryption key DB) 212, a user information database (hereinafter referred to as a user information DB) 213, a license database (hereinafter referred to as a license DB) 214, a central processing section 215, a working area 216, a communication section 217, and a format storage section 218. The terminal apparatus 22 comprises an identifier storage section 221, a communication section 222, a central processing section 223, a working area 224, and a storage device 225.

Next, the preparation which is needed in the content distribution system Scd1 before the subscriber β receives a content distributed from the entity α will be described. First, the content DB 211, the decryption key DB 212, and the user information DB 213 shown in FIG. 2 are built by the entity α.

Figure 3A:
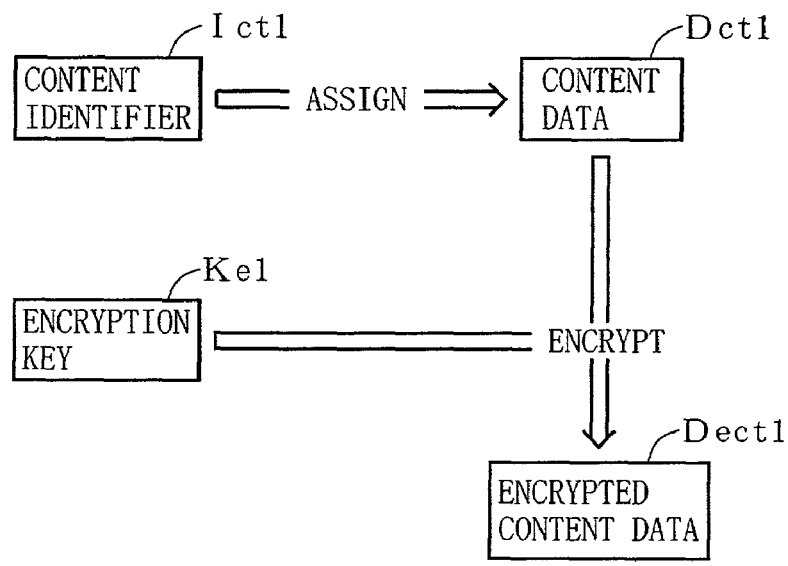
FIG. 3A is a diagram for explaining encrypted content data ect1, which is prepared by an entity α in FIG. 1.

More specifically, as shown in FIG. 3A, the entity α prepares content data Dct1 to be provided to the subscriber β. The content data Dct1 is usable to the terminal apparatus 22, and represents music in the present embodiment. The entity α assigns a content identifier Ict1 to each piece of content data Dct1. The content identifier Ict1 is a code which uniquely identifies the substance of the content data Dct1. In the case where the content data Dct1 represents music as mentioned above, ISRC (International Standard Recording Code) is applicable as the content identifier Ict1. A description of ISRC can be found at http://www.ifpi.org/index.html as of Jul. 23, 2001.

Figure 3B:
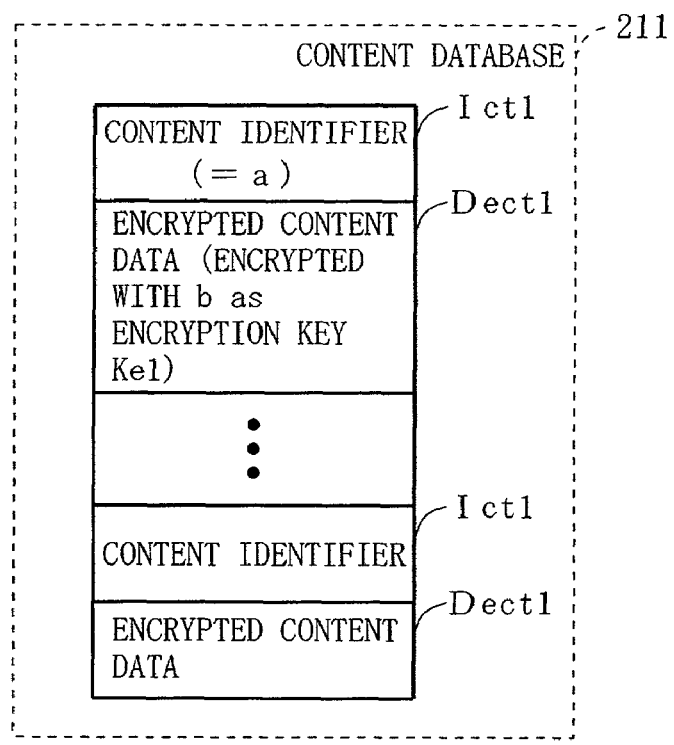
FIG. 3B is a diagram illustrating the detailed structure of a content database 211 in FIG. 2.

Furthermore, the entity α assigns an encryption key Ke1 to each piece of content data Dct1. The content data Dct1 is encrypted with the dedicated encryption key Ke1, thereby generating encrypted content data Dect1. As shown in FIG. 3B, the content DB 211 is a collection of combinations of such content identifiers Ict1 and encrypted content data Dect1. In the content DB 211, in particular, a content identifier Ict1 uniquely identifies encrypted content data Dect1 in the same set. For convenience of the following description, it is assumed that "a" is allocated as a content identifier Ict1 to a piece of encrypted content data Dect1 shown in FIG. 3A. It is further assumed that the encrypted content data Dect1 is encrypted with "b" as an encryption key Ke1.

Figure 4A:
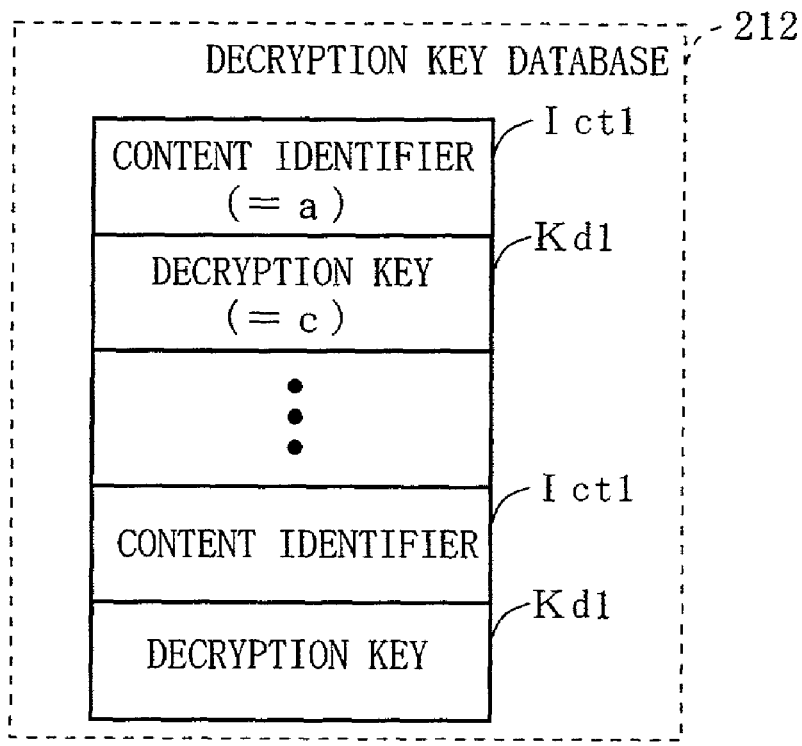
FIG. 4A and FIG. 4B are diagrams illustrating the detailed structure of a decryption key database 212 and a user information database 213 in FIG. 2.

The encrypted content data Dect1 is distributed from the server 21 to the terminal apparatus 22. Therefore, a decryption key Kd1 which is capable of decrypting the encrypted content data Dect1 needs to be provided to the terminal apparatus 22. Accordingly, the entity α prepares a decryption key Kd1 corresponding to each encryption key Ke1 in the content DB 211 (see FIG. 4A). The decryption key Kd1 may be composed of the same bit sequence as that of the encryption key Ke1 (common key encryption scheme), or composed of a different bit sequence from that of the encryption key Ke1 (public key encryption scheme). As shown in FIG. 4A, the decryption key DB 212 is a collection of combinations of the above-described content identifiers Ict1 and decryption keys Kd1. In the decryption key DB 212, each decryption key Kd1 is employed for the decryption of the encrypted content data Dect1 which can be identified by the content identifier Ict1 in the same set.

For convenience of the following description, in FIG. 4A, it is assumed that "c" is registered as a decryption key Kd1 in the same set as the content identifier Ict1 "a". As is clear from the above, the decryption key Kd1 "c" corresponds to the encryption key Ke1 "b".

Figure 4B:
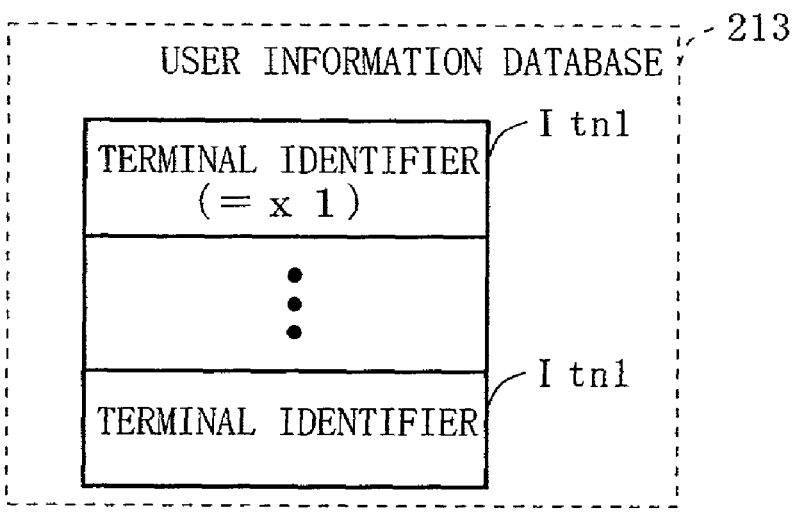

The subscriber β makes a subscription agreement for enjoying music distribution from the entity α. Based on the subscription agreement, the entity α assigns a terminal identifier Itn1 to the subscriber β. The terminal identifier Itn1 uniquely identifies the terminal apparatus 22 of the subscriber β in the content distribution system Scd1. As shown in FIG. 4B, the user information DB 213 is a collection of such terminal identifiers Itn1.

Referring back to FIG. 2, the aforementioned terminal identifier Itn1 is also set in the identifier storage section 221 of the terminal apparatus 22 of the subscriber β.

The terminal identifier Itn1 may be previously set in the identifier storage section 221, at the time of shipping the terminal apparatus 22. In such cases, the subscriber β will notify the terminal identifier Itn1 which is set in the terminal apparatus 22 to the entity α at the time of concluding the aforementioned subscription agreement. The entity α registers the notified terminal identifier Itn1 in the user information DB 213.

For convenience of the following description, as shown in FIG. 4B, it is assumed that x1" is registered in the user information DB 213 as a terminal identifier Itn1 for the terminal apparatus 22. Under this assumption, as shown in FIG. 2, "x1" is set as the terminal identifier Itn1 in the identifier storage section 221.

Figure 5:
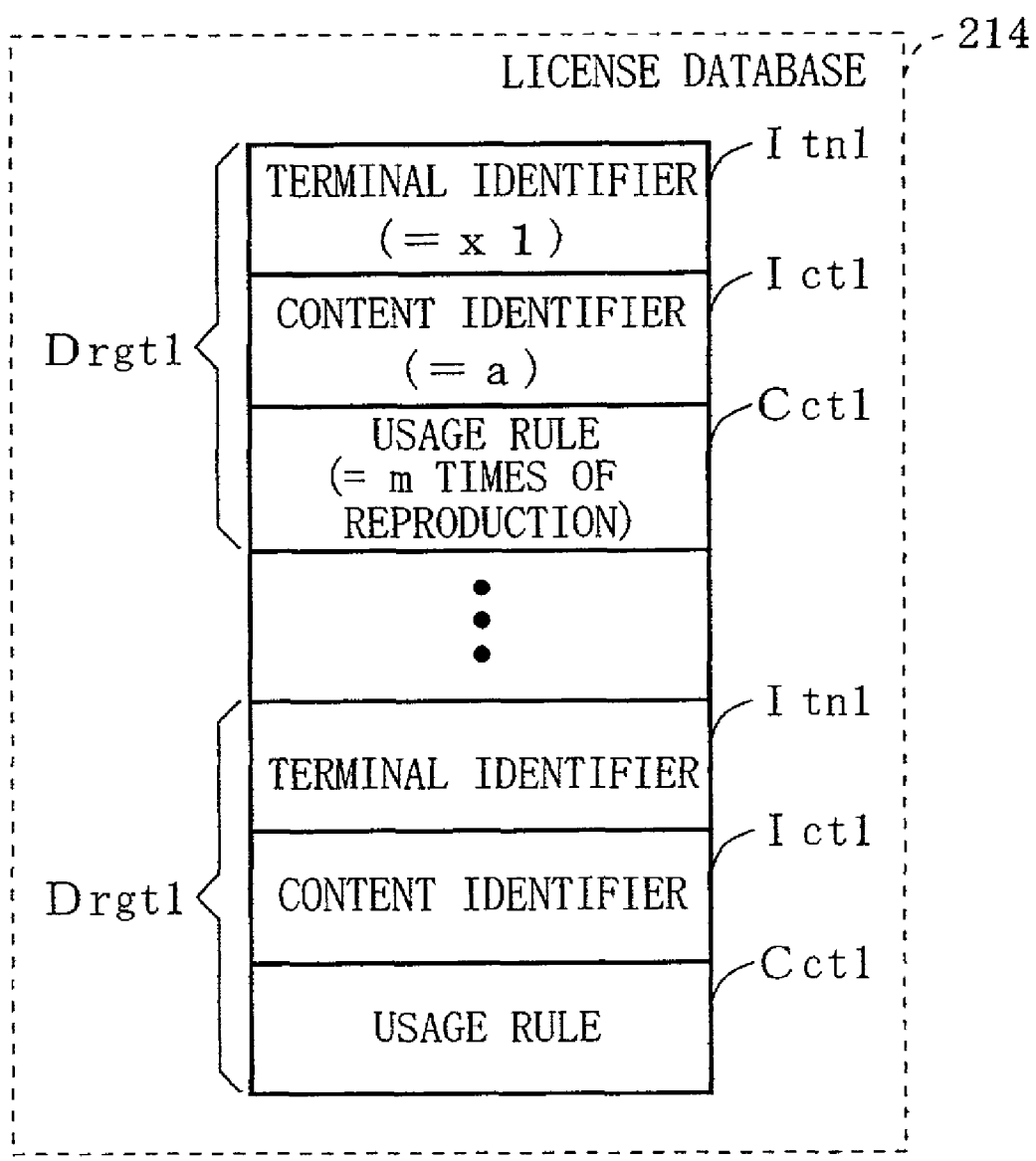
FIG. 5 is a diagram illustrating the detailed structure of a license database 214 in FIG. 2.

FIG. 5 illustrates the license DB 214, which will be described later.

Figure 6:
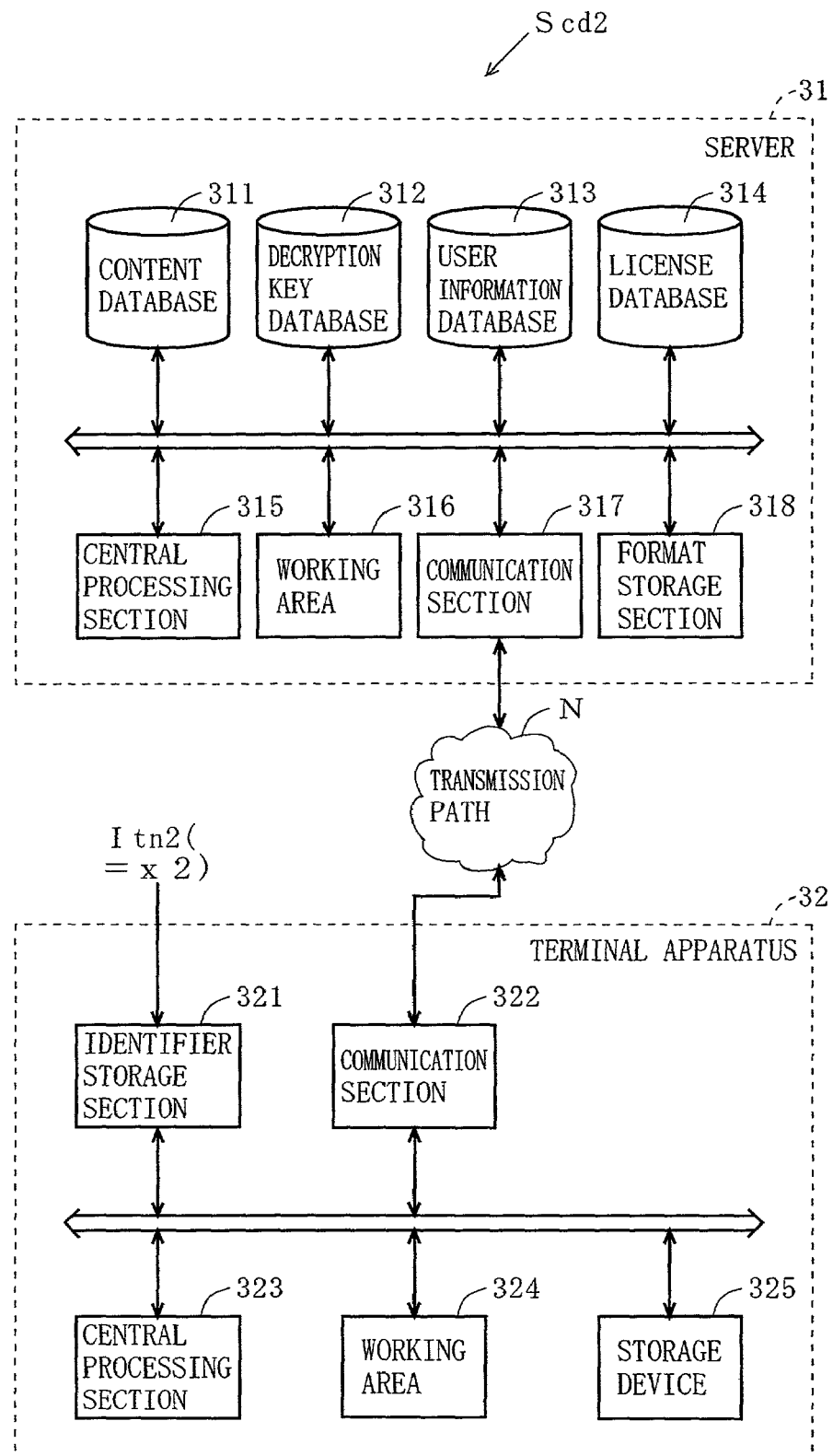
FIG. 6 is a block diagram illustrating the detailed structure of a server 31 and a terminal apparatus 32 in FIG. 2.

FIG. 6 is a block diagram illustrating the detailed structure of the server 31 and the terminal apparatus 32 in FIG. 1. Referring to FIG. 6, the server 31 comprises a content database (hereinafter referred to as a content DB) 311, a decryption key database (hereinafter referred to as a decryption key DB) 312, a user information database (hereinafter referred to as a user information DB) 313, a license database (hereinafter referred to as a license DB) 314, a central processing section 315, a working area 316, a communication section 317, and a format storage section 318. The terminal apparatus 32 comprises an identifier storage section 321, a communication section 322, a central processing section 323, a working area 324, and a storage device 325.

In the content distribution system Scd2 having the above structure, as is the case with the content distribution system Scd1, the content DB 311, the decryption key DB 312, and the user information DB 313 are first built by the entity γ.

More specifically, as described with reference to FIG. 3A, the entity γ prepares a content data Dct2 (not shown) to be provided to the subscriber δ. In the present embodiment, the content data Dct2 is usable to the terminal apparatus 32, and represents music. To each piece of content data Dct2, as in the case of the aforementioned ISRC, a content identifier Ict2 (see FIG. 7A) which uniquely identifies its substance is assigned. Note that although the content data Dct1 and Dct2 are prepared by the entities α and γ on their own, they may represent the same substance. One example would be the case where both the content data Dct1 and Dct2 represent the same song by the same singer. In other words, in the present embodiment, what is represented by the content data Dct2 is identical to that of the content data Dct1. To content data Dct1 and Dct2 having such identicalness, content identifiers Ict1 and Ict2 having the same code are assigned.

Furthermore, an encryption key Ke2 (see FIG. 7A) is assigned to each piece of content data Dct2. The content data Dct2 is encrypted with the dedicated encryption key Ke2, thereby generating encrypted content data Dect2 (see FIG. 7A). In the present embodiment, it is assumed that the encryption key Ke2 is the same as the aforementioned encryption key Ke1 in the content distribution systems Scd1 and Scd2.

Figure 7A:
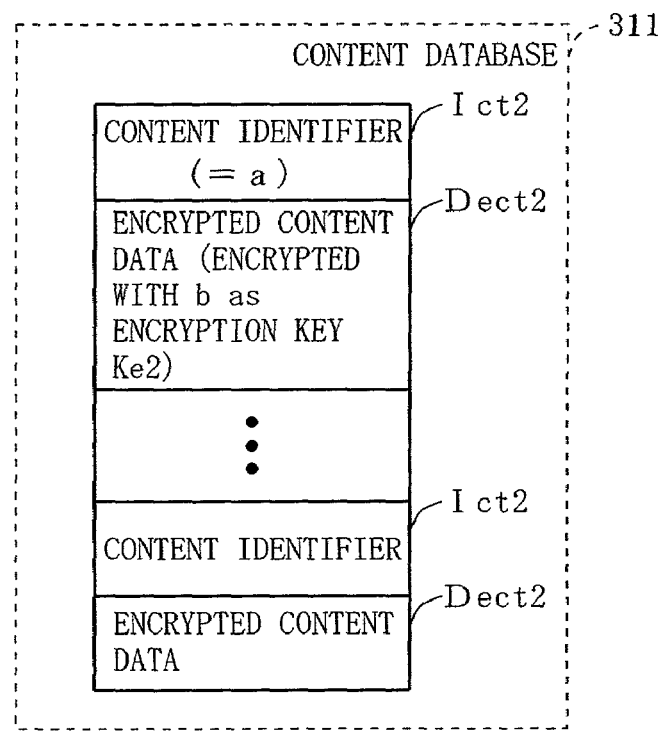
FIG. 7A and FIG. 7B are diagrams illustrating the detailed structure of a content database 311 and a decryption key database 312 in FIG. 6.

As shown in FIG. 7A, the content DB 311 is a collection of combinations of content identifiers Ict2 and encrypted content data Dect2. Note that, in the content DB 311, at least one piece of encrypted content data Dect2 has the aforementioned identicalness to encrypted content data Dect1 in the content DB 211. Thus, to any such encrypted content data Dect2 having identicalness, a content identifier Ict2 having the same code as that of the content identifier Ict1 allocated to the corresponding encrypted content data Dect1 is allocated.

For convenience of the description, it is assumed that a piece of encrypted content data Dect2 shown in FIG. 7A is encrypted by an encryption key Ke2 "b" which is identical to the encryption key Ke1, and has identicalness to the encrypted content data Dect1 illustrated in the upper half of FIG. 3B. Under this assumption, to the aforementioned encrypted content data Dect2, a content identifier Ict2 "a" which has the same code as that of the content identifier Ict1 of the encrypted content data Dect1 having identicalness with respect thereto is allocated.

Figure 7B:
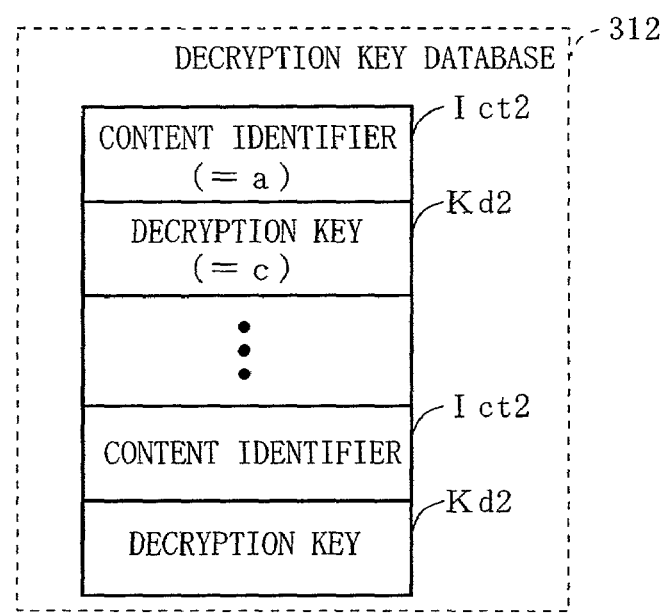

For the same reason as that for the entity α, the entity γ prepares a decryption key Kd2 corresponding to each encryption key Ke2 in the content DB 311. Herein, the decryption key Kd2 may be composed of the same bit sequence as that of the encryption key Ke2 (common key encryption scheme), or composed of a different bit sequence from that of the encryption key Ke2 (public key encryption scheme). In the present embodiment, it is conveniently assumed that the decryption key Kd2 is identical to the aforementioned decryption key Kd1. As shown in FIG. 7B, the decryption key DB 312 is a collection of combinations of the above-described content identifiers Ict2 and decryption keys Kd2.

For convenience of the description, in FIG. 7B, it is assumed that "c" is registered as a decryption key Kd2 in the same set as the content identifier Ict2 "a". As is clear from the above, the decryption key Kd2 "c" is employed for the decryption of the encrypted content data Dect2 having been encrypted with the encryption key Ke2 "b".

Figure 8A:
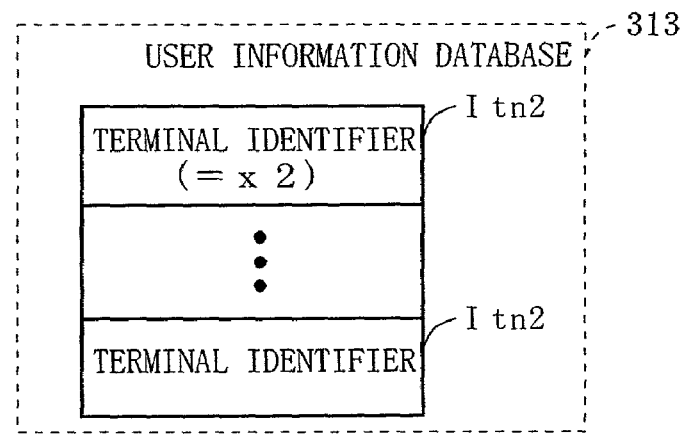
FIG. 8A and FIG. 8B are diagrams illustrating the detailed structure of a user information database 313 and a license database 314 in FIG. 6.

The aforementioned subscriber δ also makes a subscription agreement for enjoying music distribution from the entity γ. Therefore, the entity γ either assigns a terminal identifier Itn2 to the subscriber or receives it from the subscriber δ. In the content distribution system Scd2, the terminal identifier Itn2 uniquely identifies the terminal apparatus 32 of the subscriber δ. As shown in FIG. 8A, the user information DB 313 is a collection of such terminal identifiers Itn2. As shown in FIG. 6, the terminal identifier Itn2 is also set in the identifier storage section 321 of the terminal apparatus 32.

For convenience of the description, as shown in FIG. 8A, it is assumed that "x2" is registered in the user information DB 313 as a terminal identifier Itn2. Under this assumption, as shown in FIG. 6, the terminal identifier Itn2 "x2" is set in the identifier storage section 321.

Figure 8B:
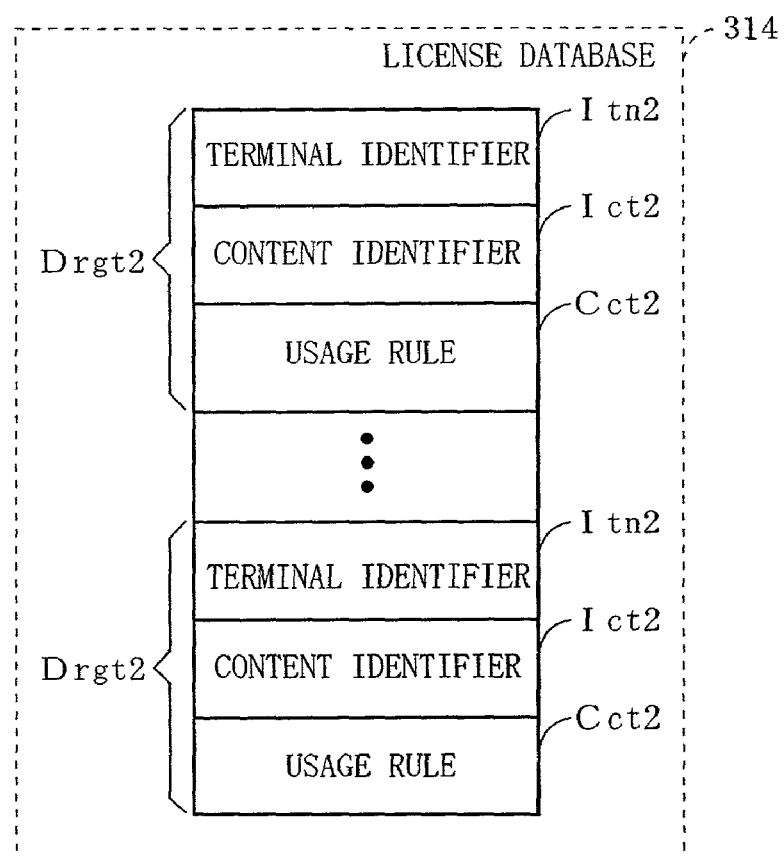

FIG. 8B illustrates a license DB 314, which will be described later.

Figure 9:
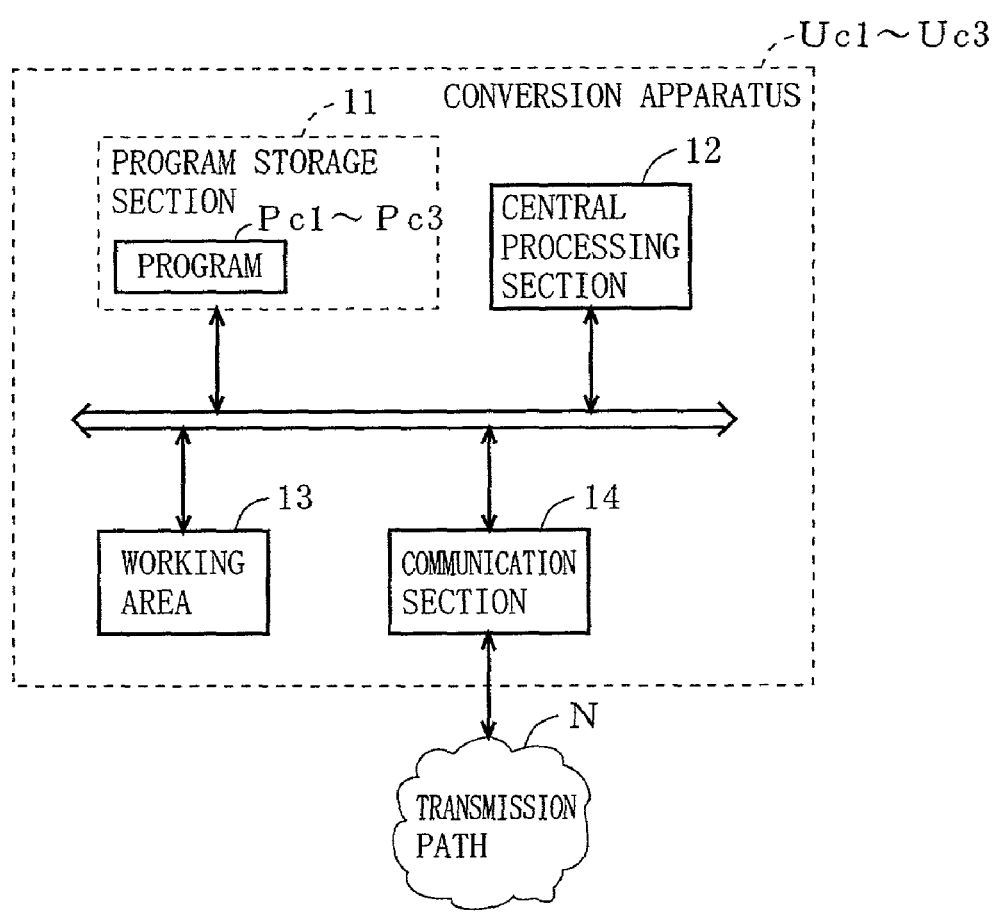
FIG. 9 is a block diagram illustrating the structure of the conversion apparatuses Uc1 to Uc3 in FIG. 1.

FIG. 9 is a block diagram illustrating the structure of the conversion apparatus Uc1 shown in FIG. 1. Referring to FIG. 9, the conversion apparatus Uc1 comprises a program storage section 11, a central processing section 12, a working area 13, and a communication section 14. The program storage section 11, which is typically composed of a ROM or a hard disk drive, stores a program Pc1. The central processing section 12 operates in accordance with the program Pc1, and performs conversion processing (see FIG. 17 and FIG. 18) for license information, which is a feature of the present embodiment. The working area 13 is employed when the central processing section 12 performs various processes. The communication section 14 is connected to the aforementioned transmission path N, and performs communications with the content distribution systems Scd1 and Scd2.

Next, operations of the conversion apparatus Uc1, and the content distribution systems Scd1 and Scd2 having the above structures will be described.

Figure 10:
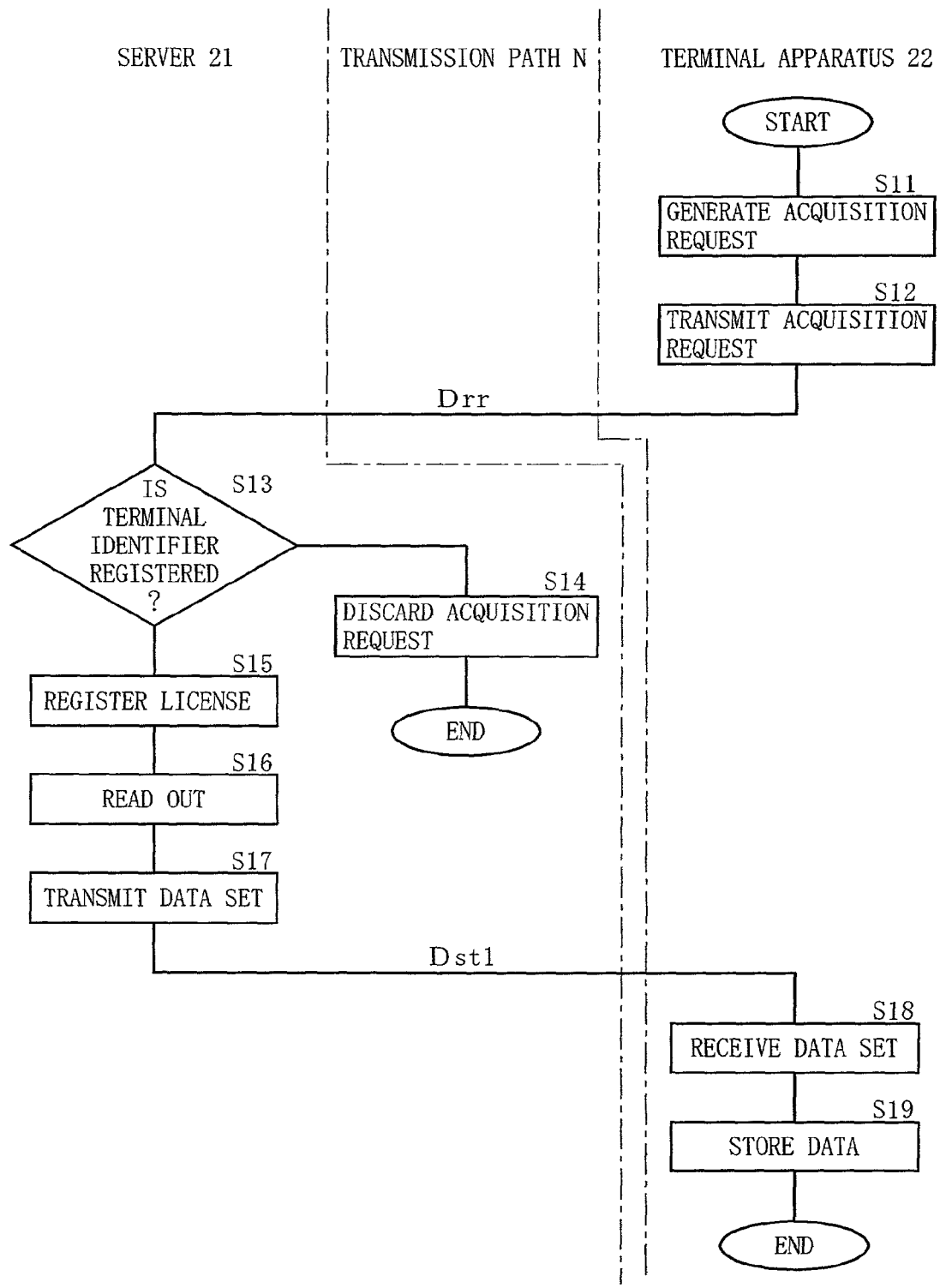
FIG. 10 is a flowchart illustrating the processing by the server 21 and the terminal apparatus 22 during content distribution by the content distribution system Scd1 in FIG. 1.

Hereinafter, first referring to FIG. 10, the processes of the respective sections when the terminal apparatus 22 receives a content distributed from the server 21 in the content distribution system Scd1 will be described. First, by operating the terminal apparatus 22, the subscriber β accesses the server 21 to specify the content identifier Ict1 of one of the content data Dct1 stocked in the content DB 211 that is to be acquired this time. In the following description, the currently specified content data Dct1 will be referred to as content data Dct1 to be acquired. Furthermore, the subscriber β designates a usage rule Cct1 for using the content data Dct1 to be acquired.

Hereinafter, the usage rule Cct1 will be described in more detail. When the content data Dct1 represents music, the typical usage rule Cct1 is a valid period, a number of times of reproduction, a maximum continuous reproduction time, a total reproduction time, or reproduction quality. The usage rule Cct1 may be a combination of two or more of a valid period, a number of times of reproduction, a maximum continuous reproduction time, a total reproduction time, and reproduction quality. The valid period as a usage rule Cct1 may be set to be from Jun. 1, 2001 to Aug. 31, 2001, for example, so that the terminal apparatus 22 can reproduce the content data Dct1 only during the set period. The number of times of reproduction may be set to be 5 times, for example, so that the terminal apparatus 22 can reproduce the content data Dct1 no more than the set number of times. The maximum continuous reproduction time, which may be set to be 10 seconds, for example, defines a maximum time during which the reproduction of the content data Dct1 is permitted for one instance of reproduction by the terminal apparatus 22. Such a maximum continuous reproduction time is especially effective for music promotion purposes. The total reproduction time may be set to be 10 hours, for example, so that the terminal apparatus 22 can freely reproduce the content data Dct1 within the set time. The reproduction quality may be set to be a CD (Compact Disc) quality, for example, so that the terminal apparatus 22 can reproduce the content data Dct1 at the set reproduction quality. Since the type of the usage rule Cct1 is not an essential feature of the present embodiment, the present embodiment will conveniently assume in the following description that the usage rule Cct1 is a number of times of reproduction for the content data Dct1.

Figure 11A:
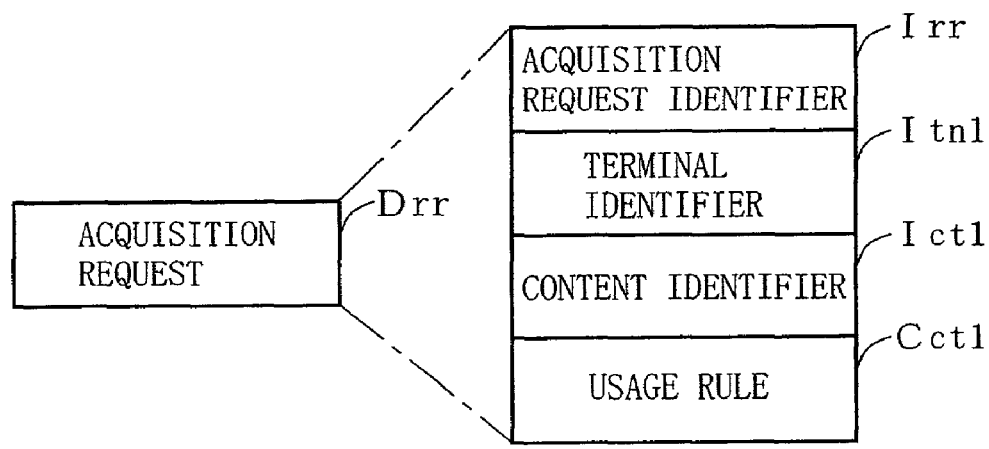
FIG. 11A is a diagram illustrating an acquisition request Drr, which is generated at step S11 in FIG. 10.

As described above, the subscriber β operates the terminal apparatus 22 to designate the content identifier Ict1 and the usage rule Cct1. Through such designation, the content identifier Ict1 and the usage rule Cct1 are stored in the working area 224 of the terminal apparatus 22. In response to this storage, the central processing section 223 generates an acquisition request Drr shown in FIG. 11A (FIG. 10; step S11). The acquisition request Drr is information for requesting the server 11 to distribute the content data Dct1 to be acquired. To more specifically describe step S11, first, the central processing section 223 transfers the terminal identifier Itn1 in the identifier storage section 221 to the working area 224. Thereafter, the central processing section 223 allocates a predetermined acquisition request identifier Irr to the terminal identifier Itn1, the content identifier Ict1, and the usage rule Cct1 on the working area 224, thereby generating an acquisition request Drr (see FIG. 11A). Herein, the acquisition request identifier Irr is employed by the server 21 to identify the acquisition request Drr.

The central processing section 223 transfers the generated acquisition request Drr from the working area 224 to the communication section 222, and the communication section 222 transmits the received acquisition request Drr to the server 21 via the transmission path N (step S12).

In the server 21 (see FIG. 2), the communication section 217 receives the acquisition request Drr from the transmission path N, and transfers and stores it to the working area 216. In response to this storage, the central processing section 215 confirms whether or not any match for the terminal identifier Itn1 which is set in the acquisition request Drr is registered in the aforementioned user information DB 213 (see FIG. 4B) (step S13). If no matching terminal identifier Itn1 is found registered, the central processing section 215 determines that the current acquisition request Drr is not from the subscriber β, discards it (step S14), and ends the process. Otherwise, the central processing section 215 determines that an acquisition request Drr from the subscriber β is being received, and performs a license registration process (step S15).

At step S15, the central processing section 215 first confirms the acquisition request identifier Irr, and recognizes that the acquisition request Drr has currently been received. Next, the central processing section 215 extracts the terminal identifier Itn1, the content identifier Ict1, and the usage rule Cct1 from the current acquisition request Drr, and registers this combination in the license DB 214. Note that, based on the acquisition request Drr, the terminal apparatus 22 is not only acquiring the content data Dct1 but also requesting a license for the content data Dct1 to be acquired. In other words, the combination of the terminal identifier Itn1, the content identifier Ict1, and the usage rule Cct1 represents a right for the terminal apparatus 22 to use the content data Dct1 to be acquired in accordance with the usage rule Cct1. In this respect, the central processing section 215 regards the combination extracted from the acquisition request Drr as license information Drgt1. In other words, as shown in FIG. 5, the license DB 214 is a collection of combinations of license information Drgt1, which is composed of a terminal identifier Itn1, a content identifier Ict1, and a usage rule Cct1.

Now, a specific example of license information Drgt1 registered in the above-described license DB 214 will be described. As has already been described above, the present embodiment assumes that the usage rule Cct1 is a number of times of reproduction. Furthermore, it is assumed that, in the current acquisition request Drr, "x1" is set as the terminal identifier Itn1, "a" is set as the content identifier Ict1, and "m times of reproduction" (where m is a natural number) is set as the usage rule Cct1. Under the above assumption, as shown in FIG. 5, the terminal identifier Itn1 "x1", the content identifier Ict1 "a", and the usage rule Cct1 "m times of reproduction" are set in one piece of license information Drgt1.

Although unrelated to the technological features of the present embodiment, in step S15, the central processing section 215 may bill the subscriber β for each registration of license information Drgt1.

Figure 11B:
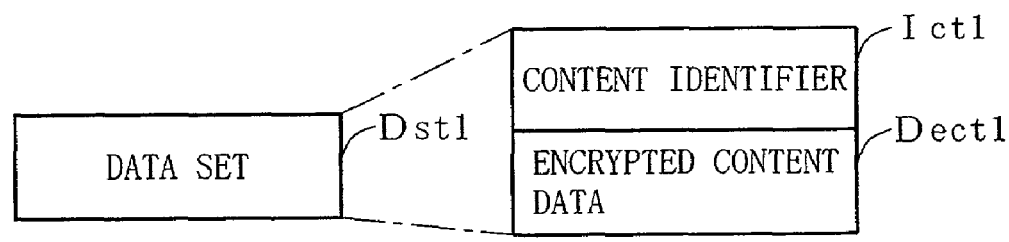
FIG. 11B is a diagram illustrating a data set Dst1, which is read at step S16 in FIG. 10.

Next, the central processing section 215 accesses the content DB 211 (see FIG. 3B), and reads out the content identifier Ict1 designated by the current acquisition request Drr and the encrypted content data Dect1 to which the content identifier Ict1 is assigned onto the working area 216 as a data set Dst1 as shown in FIG. 11B (step S16).

The central processing section 215 transfers the data set Dst1 which has been read out from the working area 216 to the communication section 217, and the communication section 217 transmits the received data set Dst1 to the terminal apparatus 22 via the transmission path N (step S17).

In the terminal apparatus 22, the communication section 222 receives the data set Dst1 from the transmission path N (step S18), and transfers and stores it to the working area 224. In response to this storage, from the content identifier Ict1 contained therein, the central processing section 223 recognizes that the currently transmit encrypted content data Dect1 has been received. Thereafter, the central processing section 223 stores the content identifier Ict1 and the encrypted content data Dect1 in the storage device 225 (step S19).

From the perspective of digital rights protection, encrypted content data Dect1 is received by the terminal apparatus 22. Therefore, in order to utilize this, it is necessary to decrypt the encrypted content data Dect1 with the decryption key Kd1 provided from the server 21. In the present content distribution system Scd1, license information Dlc1 (described later in detail) is employed in order to provide the decryption key Kd1 to the terminal apparatus 22.

Hereinafter, referring to FIG. 12 and FIG. 13, the processes of the respective sections when the terminal apparatus 22 receives the license information Dlc provided from the server 21 will be described.

Figure 14A:
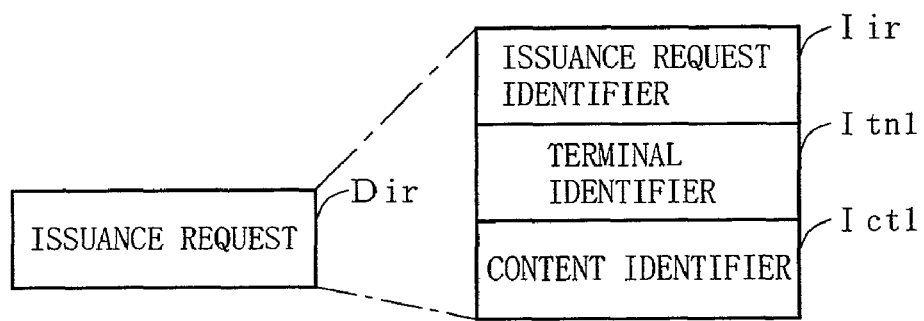
FIG. 14A is a diagram illustrating an issuance request Dir, which is generated at step S22 in FIG. 12.

First, the subscriber β operates the terminal apparatus 22 to designate one of the encrypted content data Dect1 stored in the storage device 225 that is currently desired to be used as the content data Dect1 to be decrypted. Through such designation, the content data Dect1 to be decrypted and the content identifier Ict1 thereof are transferred from the storage device 225 to be stored to the working area 224 (FIG. 12; step S21). In response to this storage, the central processing section 223 generates an issuance request Dir shown in FIG. 14A (step S22). The issuance request Dir is information for requesting the server 21 to provide the license information Dlc1, i.e., to obtain usage admission for the content data Dect1 to be decrypted. To more specifically describe step S22, the central processing section 223 first transfers the terminal identifier Itn1 in the identifier storage section 221 to the working area 224. Thereafter, the central processing section 223 allocates a predetermined issuance request identifier Iir to the terminal identifier Itn1 and the content identifier Ict1 in the working area 224, thereby generating the issuance request Dir (see FIG. 14A) Herein, the issuance request identifier Iir is employed by the server 21 to identify the issuance request Dir.

The central processing section 223 transfers the generated issuance request Dir from the working area 224 to the communication section 222, and the communication section 222 transmits the received issuance request Dir to the server 21 via the transmission path N (step S23).

In the server 21 (see FIG. 2), the communication section 217 receives the issuance request Dir from the transmission path N, and transfers and stores it to the working area 216. In response to this storage, the central processing section 215 performs a process similar to step S13 in FIG. 10 for the issuance request Dir (step S24), and if the targeted terminal identifier Itn1 is not found, discards the current issuance request Dir (step S25), as in the aforementioned step S14. On the other hand, if the targeted terminal identifier Itn1 is found, the central processing section 215 first confirms its issuance request identifier Iir to recognize that the issuance request Dir has currently been received.

Having recognized the above, the central processing section 215 determines whether or not the license information Drgt1 containing the same terminal identifier Itn1 and content identifier Ict1 as those in the current issuance request Dir is registered in the license DB 214 (see FIG. 5) (step S26).

If such license information Drgt1 is not registered, the central processing section 215 generates a usage denial, which is information indicating denial of the use of the content data Dect1 to be decrypted, and transmits it to the terminal apparatus 22 via the communication section 217 and the transmission path N (step S27). In the terminal apparatus 22, the central processing section 223 receives the usage denial via the communication section 222 (step S28). However, the central processing section 223 no longer performs processes that are necessary for the decryption of the content data Dect1 to be decrypted. Thus, in accordance with the present content distribution system Scd1, the server 21 denies decryption at the terminal apparatus 22 in the case where the license information Drgt1 is not registered in the license DB 214. As a result, it becomes possible to protect the aforementioned digital rights.

On the other hand, if step S26 finds that the license information Drgt1 has been registered, the central processing section 215 refers to the usage rule Cct1 contained therein to determine whether or not usage admission can be granted to the terminal apparatus 22 (step S29). If usage admission cannot be granted, the central processing section 215 performs the aforementioned step S27. As a result, no processes related to the decryption of the content data Dct1 to be decrypted are performed in the terminal apparatus 22. Thus, in accordance with the present content distribution system Scd1, the server 21 denies decryption at the terminal apparatus 22 also in the case where valid license information Drgt1 is not registered in the license DB 114. Therefore, as described above, it becomes possible to protect the digital rights.

On the other hand, if step S29 finds that usage admission can be granted, the central processing section 215 generates usage admission information Dlw1, and stores it in the working area 216 (step S210). The usage admission information Dlw1 is information for permitting the terminal apparatus 22 identified by the current issuance request Dir to use the content data Dct1. However, since it is undesirable from the perspective of digital rights protection to unconditionally grant usage admission to the terminal apparatus 22, it is preferable that the aforementioned usage admission information Dlw1 indicates under which condition usage admission should be given to the terminal apparatus 22. Herein, as described earlier, the usage rule Cct1 in the license information Drgt1 represents under what condition the content data Dct1 is used by the terminal apparatus 22. In this respect, in the present embodiment, it is more preferable that the usage admission information Dlw1 indicates usage admission for the terminal apparatus 22 within the limits of the usage rule Cct1.

Moreover, in the present embodiment, a part or whole of the license information Drgt1 of the terminal apparatus 22 is employed for the generation of the usage admission information Dlw1. Therefore, next to step S210, the central processing section 215 updates the employed license information Drgt1 (step S211).

Now, a specific example of the process from step S26 to S211 will be described. It is assumed that, as shown in FIG. 5, license information Drgt1 composed of a terminal identifier Itn1 "x1", a content identifier Ict1 "a", and a usage rule Cct1 "m times of reproduction" is registered in the license DB 214. It is also assumed that, the current issuance request Dir contains the terminal identifier Itn1 "x1" and the content identifier Ict1 "a".

Under the above assumption, at step S26, it is determined that license information Drgt1 containing the terminal identifier Itn1 "x1" and the content identifier Ict1 "a" has been registered. Furthermore, it is determined at step S29 that usage admission can be given to the terminal apparatus 22 because "m times of reproduction" is set in this license information Drgt1. Once so determined, usage admission information Dlw1 is generated at step S210. The generated usage admission information Dlw1 may represent, for example, "n times of reproduction". Herein, n is a natural number not exceeding m, and more preferably is set in accordance with the processing ability of the terminal apparatus 22. For example, in the case where the terminal apparatus 22 incorporates hardware having a relatively low performance, n is preferably set to be a minimum value which makes the content data Dct1 to be decrypted is usable the terminal apparatus 22, e.g., "1",. The present embodiment conveniently assumes that n=1 in the following description.

Thus, the terminal apparatus 22 (whose terminal identifier Itn1 is "x1") will use the license for the content data Dct1 (whose content identifier Ict1 is "a") n times. Therefore, at step S211, the usage rule Cct1 is updated from "m times of reproduction" to "(m−n) times of reproduction".

Figure 13:
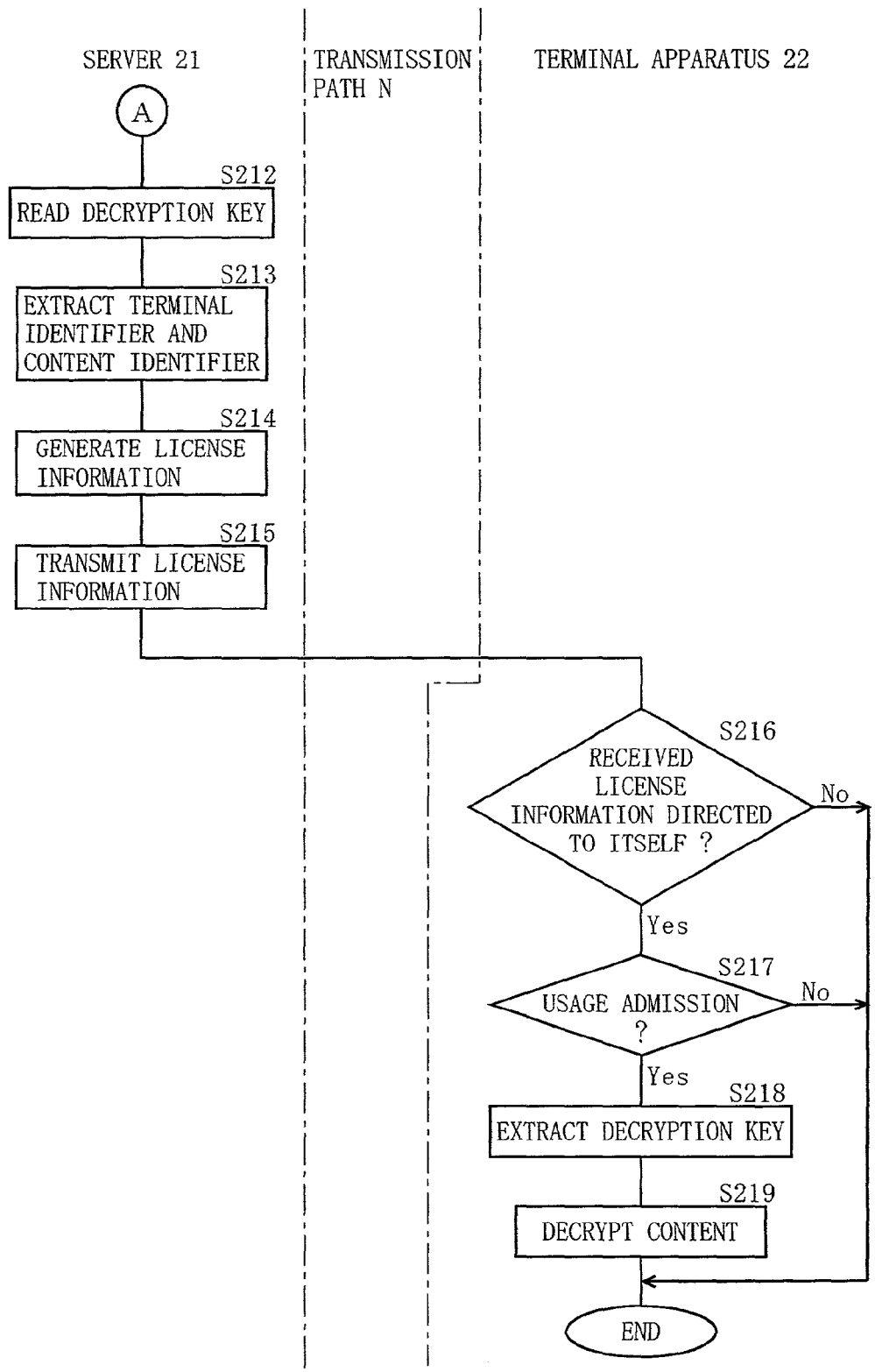
FIG. 13 is a latter half of a flowchart illustrating the processing by the server 21 and the terminal apparatus 22 when providing license information in the content distribution system Scd2 in FIG. 1.
Figure 14B:
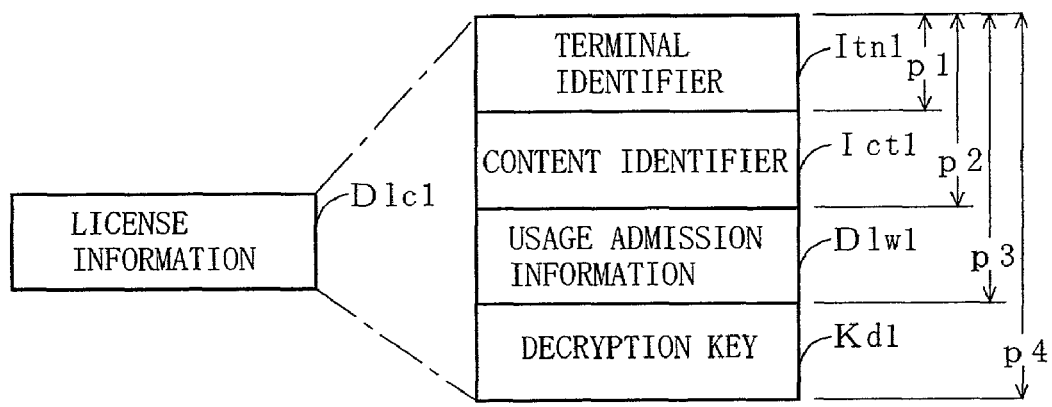
FIG. 14B is a diagram illustrating license information Dlc1, which is generated at step S214 in FIG. 13.

Next to step S211, the central processing section 215 reads out, from the decryption key DB 212 (see FIG. 4A), the decryption key Kd1 in the same set as the content identifier Ict1 that is contained in the current issuance request Dir into the working area 216 (FIG. 13; step S212). Next, the central processing section 215 extracts from the current issuance request Dir the terminal identifier Itn1 and the content identifier Ict1, into the working area 216 (step S213). The terminal identifier Itn1, the content identifier Ict1, the usage admission information Dlw1, and the decryption key Kd1 become ready on the working area 216 through this step S213. Next, the central processing section 215 places the terminal identifier Itn1, the content identifier Ict1, the usage admission information Dlw1, and the decryption key Kd1 on the working area 216 in order, thereby generating license information Dlc1 as shown in FIG. 14B (step S214). The license information Dlc1 as described above is information for controlling the use of the content data Dct1 to be decrypted by the terminal apparatus 22. Note that p1 to p4 in FIG. 14B will be described later.

Based on the earlier-mentioned assumptions, in the current license information Dlc1, the terminal identifier Itn1 is "x1", the content identifier Ict1 is "a", and the usage admission information Dlw1 is "1". Furthermore, the decryption key Kd1 is "c".

The central processing section 215 transfers the license information Dlc1 which has been generated as above from the working area 216 to the communication section 217. The communication section 217 transmits the received license information Dlc1 to the terminal apparatus 22 via the transmission path N (step S215). Since the license information Dlc1 should not be utilized by a person unrelated to the subscriber β, it is preferable that the server 21 and the terminal apparatus 22 exchange the license information Dlc1 under secure communications such as SSL (Secure Socket Layer).

In the terminal apparatus 22, the communication section 222 receives the license information Dlc1 from the transmission path N and determines whether or not it is directed to this terminal apparatus based on the received license information Dlc1 (step S216). If the received license information Dlc1 is not directed to the terminal apparatus 22, the central processing section 223 does not perform subsequent processing. On the other hand, if it is determined that license information Dlc1 directed to the terminal apparatus 22 has been received, the central processing section 223 transfers and stores it to the working area 224. In response to this storage, the central processing section 223 refers to the usage admission information Dlw1 in the current license information Dlc1, and determines whether or not usage admission for the content data Dct1 to be decrypted has been granted (step S217).

If usage admission has not been granted, the central processing section 223 does not perform subsequent processing. Thus, in accordance with the present content distribution system Scd1, unless usage admission is granted from the server 21, the terminal apparatus 22 cannot decrypt the content data Dct1 to be decrypted. As a result, it becomes possible to protect the aforementioned digital rights.

On the other hand, if step S217 finds that usage admission has been granted, the central processing section 223 extracts the decryption key Kd1 from the received license information Dlc1 (step S218).

Now, a specific example of steps S217 and S218 will be described. Under the aforementioned assumption, reproduction of the content data Dct1 is permitted only once based on the usage admission information Dlw1 in the current license information Dlc1. In this case, since the number of times of reproduction which is set in the usage admission information Dlw1 is "1", the central processing section 223 determines at step S217 that usage admission for the content data Dct1 to be decrypted has been granted, and extracts the decryption key Kd1 "c" from the received license information Dlc1 at step S218.

Figure 12:
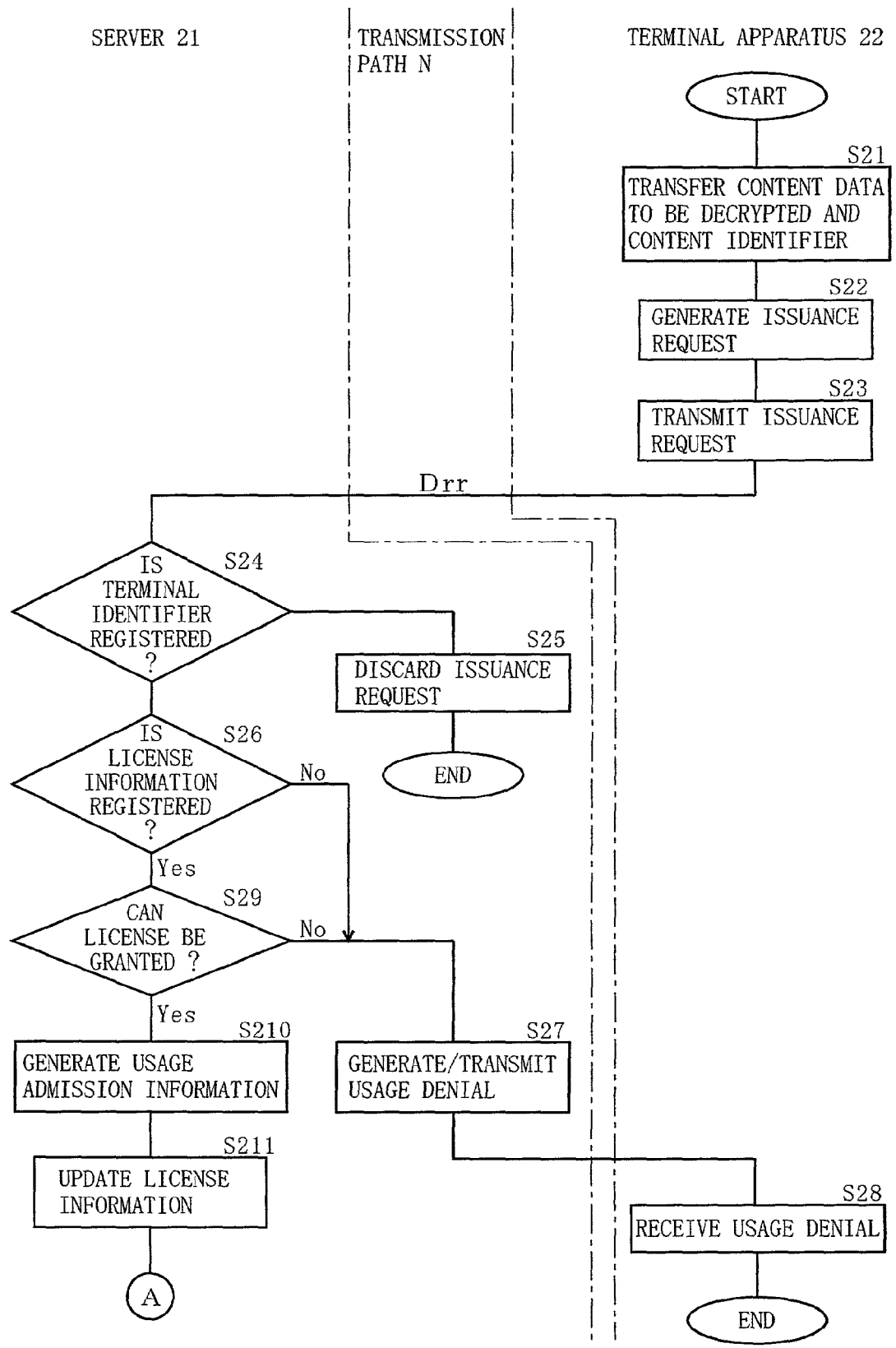
FIG. 12 is a former half of a flowchart illustrating the processing by the server 21 and the terminal apparatus 22 when providing license information in the content distribution system Scd2 in FIG. 1.

As described earlier, the content data Dct1 to be decrypted is already stored in the working area 224 (FIG. 12; see step S21). The central processing section 223 decrypts this content data Dct1 to be decrypted with the decryption key Kd1 obtained at step S218 (step S219). As a result, the central processing section 223 becomes capable of obtaining the content data Dct1, and causes music to be outputted via loudspeakers (not shown). Thus, the subscriber β can listen to desired music. In the case where the usage admission information Dlw1 represents a number of times of reproduction as in the present embodiment, it is preferable that the central processing section 223 decrements the usage admission information Dlw1 in the current license information Dlc1 by "1" every time the above-described reproduction of the content data Dct1 is completed.

In the content distribution system Scd2 shown in FIG. 6, as is the case with the content distribution system Scd1, the terminal apparatus 32 receives content distribution and license information from the server 31. The processes by these during content distribution will be apparent from FIG. 10, and the processes by these during the provision of license information will be apparent from FIG. 12 and FIG. 13, and the descriptions thereof are omitted. During the provision of license information, as in the case of the license information Dlc1, the server 31 generates license information Dlc2 for controlling the use of content data Dct2 by the terminal apparatus 32, by referring to the license DB 314 shown in FIG. 8B.

In the above description, the content data Dct1 is not limited to those representing music, but may be any data which is usable to the terminal apparatus 22. For example, the content data Dct1 may represent a television program, a movie, a radio program, music, a book or printed material. The above description illustrates the usage rule Cct1 in the case where the content data Dct1 represents music. However, rather than being limited to the above, the usage rule Cct1 is preferably set in an appropriate manner according to the substance represented by the content data Dct1. The above description conveniently assumes that, since the content data Dct1 represents music, the terminal apparatus 22 outputs the music the content data Dct1 decrypted at step S218 via loudspeakers. However, rather than being limited to the above, depending on the kind of content data Dct1, the terminal apparatus 22 may be substituted with those which can produce video output of television programs, movies, books and printed material, and game contents, or produce audio output of radio programs. Furthermore, the terminal apparatus 22 may comprise an interface which can transfer the decrypted content data Dct1 to an external device (a television set, a radio receiver, a music player, an electronic book reader, a game machine, a PC, a personal digital assistance, a mobile phone, an external memory device, etc.). This also applies to the content distribution system Scd2.

In the above description, the terminal apparatus 22 is illustrated as controlling the use of the content data Dct1 by employing the license information Dlc1 provided from the server 21. In addition, the subscriber β may desire to pass his/her own license information Dlc1 to the subscriber δ, who is subscribing to content distribution by the entity γ, without employing it for the sake of using the content data Dct1. However, conventionally, it has been difficult to pass license information Dlc1 because the content distribution systems Scd1 and Scd2 are managed by the entities α and γ, which have different policies in various aspects. If the subscriber β is the same person as the subscriber δ, the user may desire to employ the license information Dlc1, which is usable in the content distribution system Scd1, at the terminal apparatus 32, which corresponds to the content distribution system Scd2. However, conventionally, such change in the license information Dlc1 has also been difficult due to the entities α and γ having different policies from each other.

In the present embodiment, it is assumed that the difference in policies between the entities α and γ is in the formats of the license information Dlc1 and Dlc2. While the license information Dlc1 has been described with reference to FIG. 14B, more specifically speaking, the terminal identifier Itn1 is set down to the $p1^{th}$ bit as counted from the start bit of the license information Dlc1; the content identifier Ict1 is set from the $(p1+1)^{th}$ bit to the $p2^{th}$ bit; the usage admission information Dlw1 is set from the $(p2+1)^{th}$ bit to the $p3^{th}$ bit; and the decryption key Kd1 is set from the $(p3+1)^{th}$ bit to the $p4^{th}$ bit. Herein, p1 to p4 are natural numbers satisfying p1<p2<p3<p4.

Figure 15A:
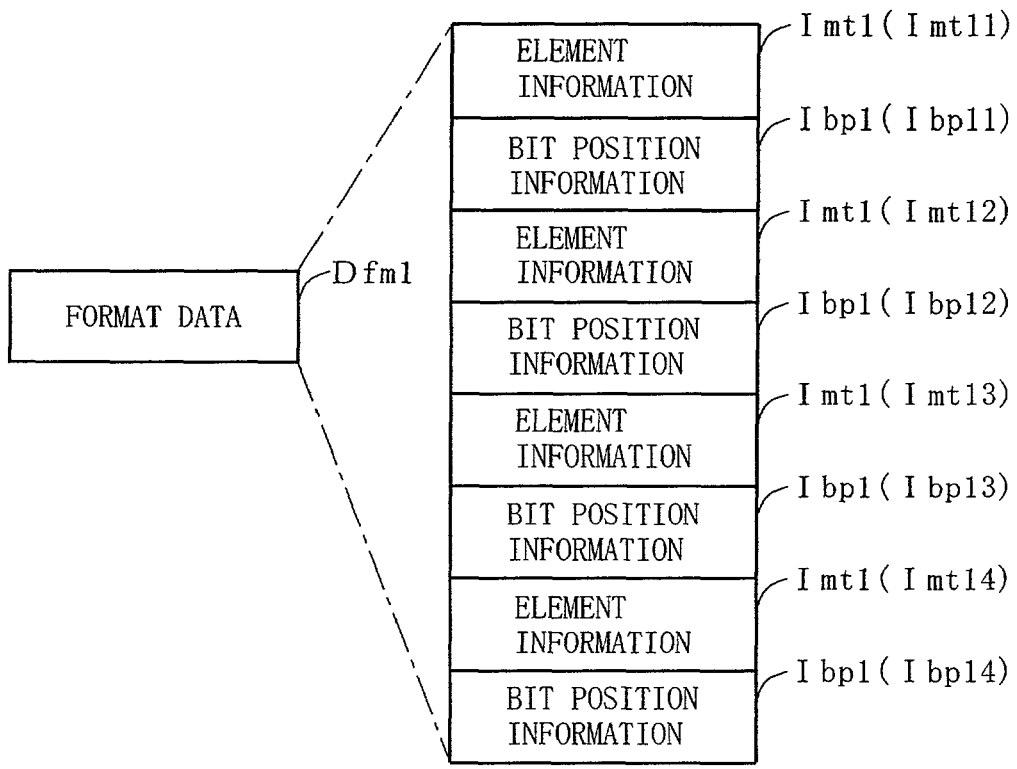
FIG. 15A is a diagram illustrating format data Dfm1, which is stored in a format storage section 218 in FIG. 2.

Format data Dfm1, representing such a format for the license information Dlc1, is stored in the format storage section 218 of the server 21. As described above, the license information Dlc1 is composed of the following component elements: a terminal identifier Itn1, a content identifier Ict1, usage admission information Dlw1, and a decryption key Kd1. In this case, as shown in FIG. 15A, the format data Dfm1 is composed of 4 sets—from element information Imt11 and bit position information Ibp11 to element information Imt14 and bit position information Ibp14—which correspond to the number of component elements in the license information Dlc1. The element information Imt11 specifies the terminal identifier Itn1. The element information Imt12 specifies the content identifier Ict1. The element information Imt13 specifies the usage admission information Dlw1. Furthermore, the element information Imt14 specifies the decryption key Kd1. The bit position information Ibp11 is composed of "1" as a start bit position of the terminal identifier Itn1 and "p1" as an end bit position thereof. The bit position information Ibp12 is composed of "(p1+1)" as a start bit position of the content identifier Ict1 and "p2" as an end bit position. The bit position information Ibp13 is composed of "(p2+1)" as a start bit position of the usage admission information Dlw1 and "p3" as an end bit position. The bit position information Ibp14 is composed of "(p3+1)" as a start bit position of the decryption key Kd1 and "p4" as an end bit position.

The license information Dlc2 is information which is generated in the server 32 as described above, and, as shown in FIG. 15B, contains a terminal identifier Itn2, a content identifier Ict2, usage admission information Dlw2, and a decryption key Kd2. The usage admission information Dlw2 is information for controlling the use of the content data Dct2 by the terminal apparatus 32. The terminal identifier Itn2 is set down to the $q1^{th}$ bit as counted from the start bit of the license information Dlc2; the content identifier Ict2 is set from the $(q1+1)^{th}$ bit to the $q2^{th}$ bit; the usage admission information Dlw2 is set from the $(q2+1)^{th}$ bit to the $q3^{th}$ bit; and the decryption key Kd2 is set from the $(q3+1)^{th}$ bit to the $q4^{th}$ bit. Herein, q1 to q4 are natural numbers satisfying q1<q2<q3<q4.

Note that, as described above, the license information Dlc1 is information for controlling the use of the content data Dct1 identified by the content identifier Ict1. Therefore, in the license information Dlc2, the content identifier Ict2 needs to pertain to content data Dct2 having identicalness to the content data Dct1 which is usable based on the license information Dlc1. Moreover, in the present embodiment, the content identifiers Ict1 and Ict2 having the same code are assigned to content data Dct1 and Dct2 having identicalness to each other. Therefore, the following description will assume that p1 and q1 have the same value. As mentioned earlier, the present embodiment also assumes that the decryption keys Kd1 and Kd2 are the same. Therefore, the following description will assume that (p3−p2) and (q3−q2) have the same value. In other words, in the present embodiment, the numbers of bits for expressing the terminal identifier Itn1 and the terminal identifier Itn2 and the number of bits for expressing the usage admission information Dlw1 and Dlw2 differ.

Figure 16:
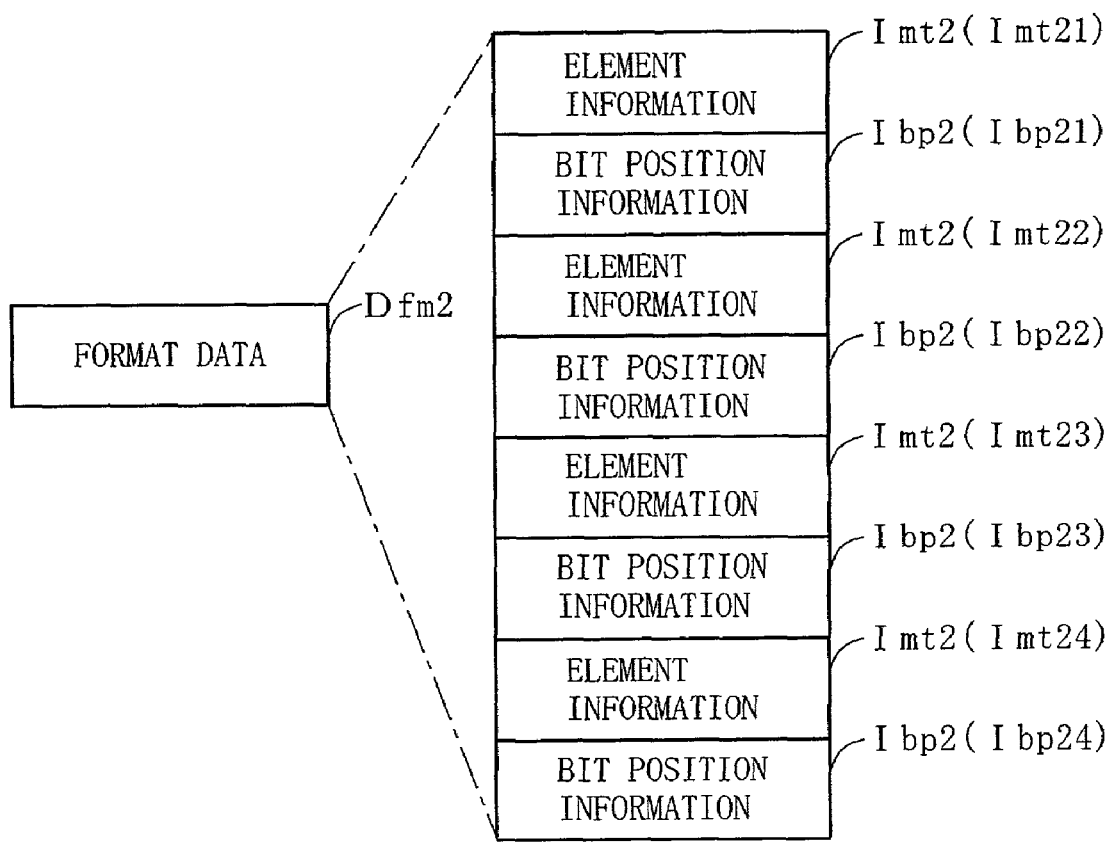
FIG. 16 is a diagram illustrating format data Dfm2, which is stored in a format storage section 318 in FIG. 6.

Format data Dfm2, representing such a format for the license information Dlc2, is stored in the format storage section 318 of the server 31. As shown in FIG. 16, the format data Dfm2 is composed of 4 sets—from element information Imt21 and bit position information Ibp21 to element information Imt24 and bit position information Ibp24—in connection with the component elements in the license information Dlc2. The element information Imt21 specifies the terminal identifier Itn2. The element information Imt22 specifies the content identifier Ict2. The element information Imt23 specifies the usage admission information Dlw2. Furthermore, the element information Imt24 specifies the decryption key Kd2. The bit position information Ibp21 is composed of "1" as a start bit position of the terminal identifier Itn2 and "q1" as an end bit position q1 thereof. The bit position information Ibp22 is composed of "(q1+1)" as a start bit position of the content identifier Ict2 and an end bit position q2. The bit position information Ibp23 is composed of a start bit position (q2+1) and an end bit position q3 of the usage admission information Dlw2. The bit position information Ibp24 is composed of a start bit position (q3+1) and an end bit position q4 of the decryption key Kd2.

As mentioned earlier, there has been a problem in that the terminal apparatus 32 at the subscriber δ can interpret the license information Dlc2 but cannot interpret the license information Dlc1 received as it is. Accordingly, the conversion apparatus Uc1 performs a license conversion process to convert the format of the license information Dlc1 so that it can be used at the terminal apparatus 32.

Hereinafter, referring to FIG. 17 and FIG. 18, the processes by the conversion apparatus Uc1 and the terminal apparatus 22 during license conversion will be described. First, the subscriber β operates the terminal apparatus 22 to designate license information Dlc1 to be converted currently. Furthermore, the subscriber β operates the terminal apparatus 22 to designate a terminal identifier Itn2 which the license information Dlc1 to be converted is eventually employed. Furthermore, the subscriber β operates the terminal apparatus 22 to designate a content distribution system Scd1 in which the pre-conversion license information Dlc1 can be employed, and a content distribution system Scd2 corresponding to the post-conversion format. Through such designation, license information Dlc1, a terminal identifier Itn2, pre-conversion identification information Ici and post-conversion identification information Idi (see FIG. 19A) are stored in the working area 224. Herein, the pre-conversion identification information Ici is information which identifies the server 21 in the content distribution system Scd1, and the post-conversion identification information Idi is information which identifies the server 31 in the content distribution system Scd2.

Figure 17:
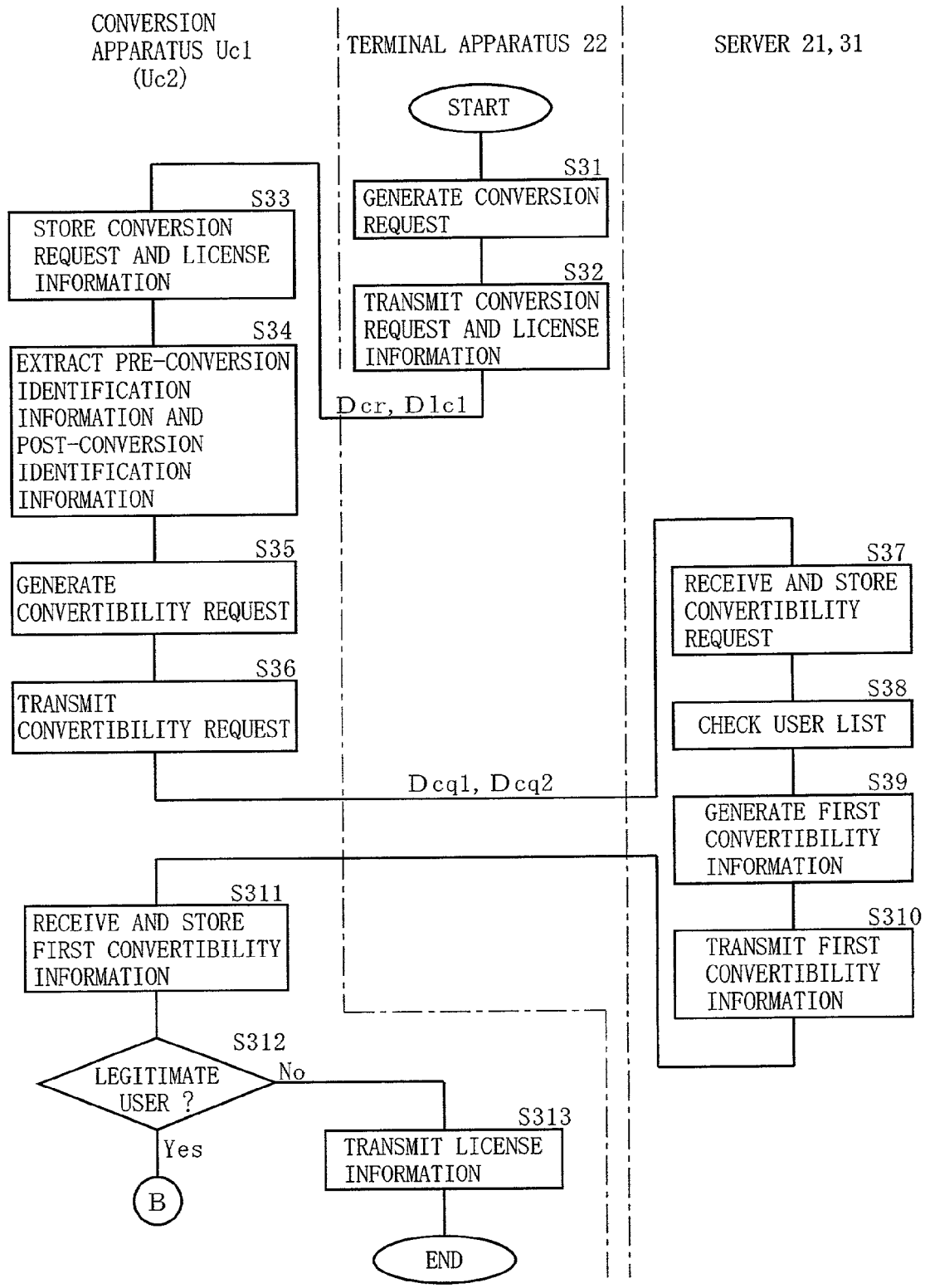
FIG. 17 is a former half of a flowchart illustrating the processing by the conversion apparatus Uc1 shown in FIG. 9 and the terminal apparatus 22 in FIG. 2 during a license conversion process.
Figure 19A:
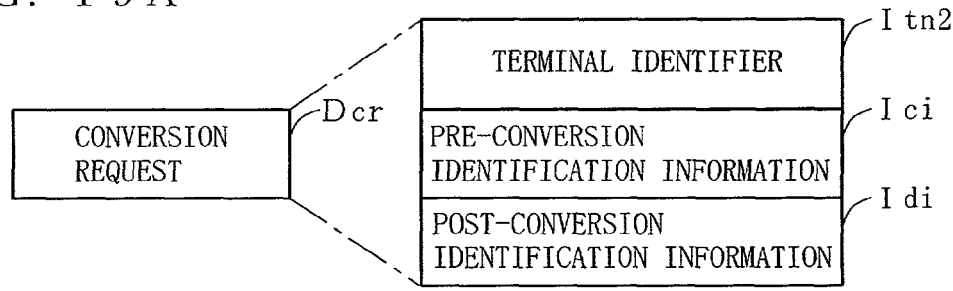
FIG. 19A is a diagram illustrating a conversion request Dcr, which is generated at step S31 in FIG. 17.

In response to this storage, the central processing section 223 generates a conversion request Dcr as shown in FIG. 19A on the working area 224 (FIG. 17; step S31). The conversion request Dcr, which is information for requesting the conversion apparatus Uc1 to convert the aforementioned license information Dlc1, contains a terminal identifier Itn2, the aforementioned pre-conversion identification information Ici and the post-conversion identification information Idi, as shown in FIG. 19A.

The central processing section 223 transfers the generated conversion request Dcr and the license information Dlc1 from the working area 224 to the communication section 222. The communication section 222 transmits the received conversion request Dcr and license information Dlc1 to the conversion apparatus Uc1 via the transmission path N (step S32). Since the license information Dlc1 should not be utilized by a person unrelated to the subscriber β, it is preferable that the conversion apparatus Uc1 and the terminal apparatus 22 exchange at least the license information Dlc1 under secure communications such as SSL (Secure Socket Layer).

Figure 19B:
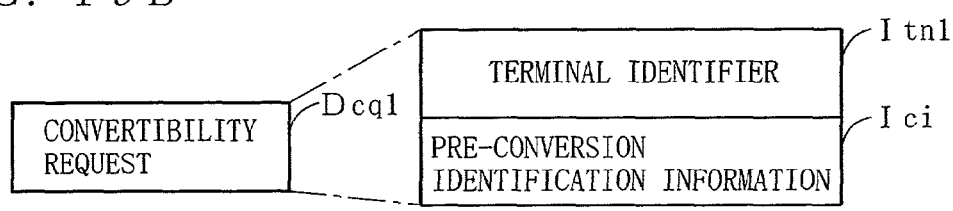
FIG. 19B and FIG. 19C are diagrams illustrating convertibility requests Dcq1 and Dcq2, which are generated at step S35 in FIG. 17.
Figure 19C:
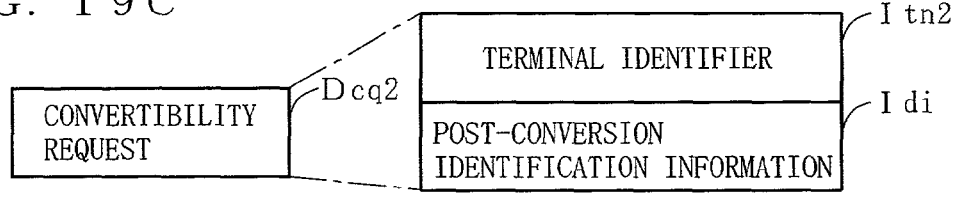

In the conversion apparatus Uc1 (see FIG. 9), the communication section 14 receives the conversion request Dcr and the license information Dlc1 from the transmission path N, and transfers and stores them to the working area 13 (step S33). In response to this storage, the central processing section 12 operates in accordance with the program Pc1 in the program storage section 11, and first extracts the terminal identifier Itn2, the pre-conversion identification information Ici, and the post-conversion identification information Idi from the current conversion request Dcr (step S34). Thereafter, the central processing section 12 generates convertibility requests Dcq1 and Dcq2 as shown in FIG. 19B and FIG. 19C on the working area 13 (step S35). Herein, the convertibility request Dcq1, which is information for requesting the server 21 to transmit the first convertibility information Iack1 indicating whether or not the terminal apparatus 22 which has sent the license information Dlc1 to be converted is the authorized subscriber β in the content distribution system Scd1, contains at least the terminal identifier Itn1 for the terminal apparatus 22 and the pre-conversion identification information Ici, as shown in FIG. 19B. Note that since the conversion apparatus Uc1 has established a connection for secure communications with the terminal apparatus 22, the conversion apparatus Uc1 can acquire the terminal identifier Itn1 without setting the terminal identifier Itn1 in the conversion request Dcr. The convertibility request Dcq2, which is information for requesting the server 32 to transmit the first convertibility information Iack2 indicating whether or not the terminal apparatus 32, which employs the license information Dlc2 after conversion is the authorized subscriber δ in the content distribution system Scd2, contains at least the terminal identifier Itn2 for the terminal apparatus 32 and the post-conversion identification information Idi, as shown in FIG. 19C.

The central processing section 12 transfers the generated convertibility requests Dcq1 and Dcq2 from the working area 13 to the communication section 14. The communication section 14 transmits the received convertibility requests Dcq1 and Dcr2 to the servers 21 and 31 via the transmission path N (step S36).

In the servers 21 and 31 (see FIG. 2 and FIG. 6), the communication sections 217 and 317 receive the convertibility requests Dcq1 and Dcq2 from the transmission path N, and transfer and store them to the working areas 216 and 316 (step S37). After interpreting the store convertibility requests Dcq1 and Dcq2, the central processing sections 215 and 315 check whether or not the terminal identifiers Itn1 and Itn2 which are respectively set therein are registered in the user lists (not shown) of the content distribution systems Scd1 and Scd2 (step S38).

Figure 19D:
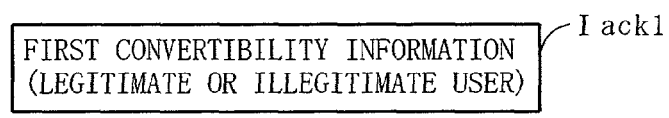
FIG. 19D and FIG. 19E are diagrams illustrating first convertibility information Iack1 and Iack2, which are generated at step S39 in FIG. 17.
Figure 19E:
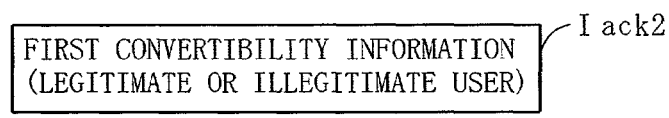

Thereafter, in accordance with the result of the check of step S38, both central processing sections 215 and 315 generate the first convertibility information Iack1 and Iack2 on the working areas 216 and 316 as shown in FIG. 19D and FIG. 19E (step S39). The first convertibility information Iack1 contains information indicating the result of the check of step S38 by the server 21, i.e., whether or not the terminal apparatus 22 is an authorized user of the content distribution system Scd1. The first convertibility information Iack2 contains information indicating whether or not the terminal apparatus 32 is an authorized user of the content distribution system Scd2.

The central processing sections 215 and 315 transfer the generated first convertibility information Iack1 and Iack2 from the working areas 216 and 316 to the communication sections 217 and 317. The communication sections 217 and 317 transmit the received first convertibility information Iack1 and Iack2 to the conversion apparatus Uc1 via the transmission path N (step S310).

In the conversion apparatus Uc1 (see FIG. 9), the communication section 14 receives the first convertibility information Iack1 and Iack2 from the transmission path N, and stores them in the working area 13 (step S311). Thereafter, the central processing section 12 interprets the stored first convertibility information Iack1 and Iack2 to determine whether or not the terminal apparatuses 22 and 32 are authorized users of the content distribution systems Scd1 and Scd2 (step S312).

Figure 18:
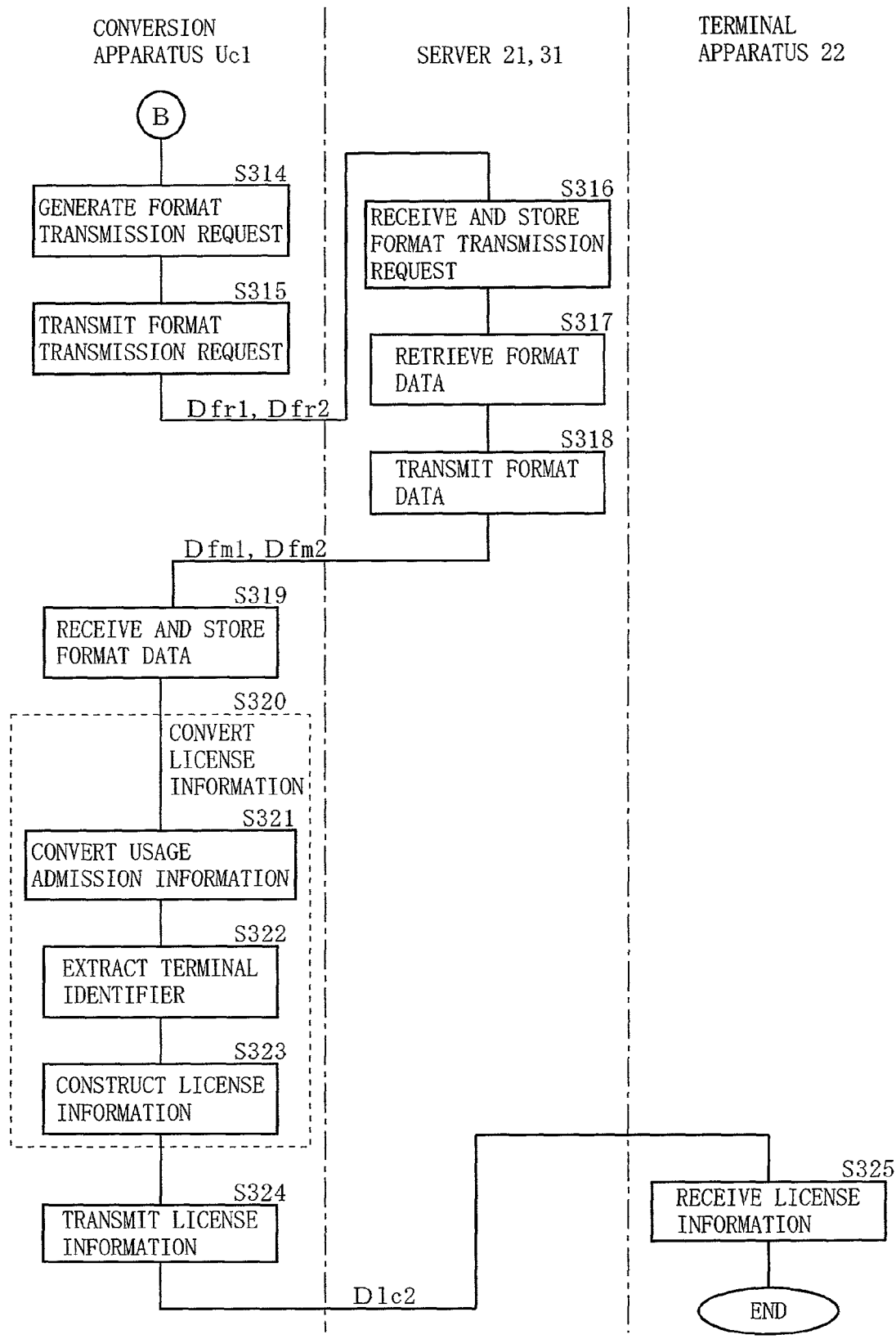
FIG. 18 is a latter half of a flowchart illustrating the processing by the conversion apparatus Uc1 shown in FIG. 9 and the terminal apparatus 22 in FIG. 2 during a license conversion process.
Figure 19F:
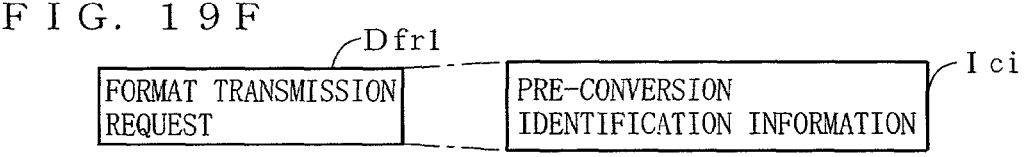
FIG. 19F and FIG. 19G are diagrams illustrating format transmission requests Dfr1 and Dfr2, which are generated at step S35 in FIG. 17.
Figure 19G:
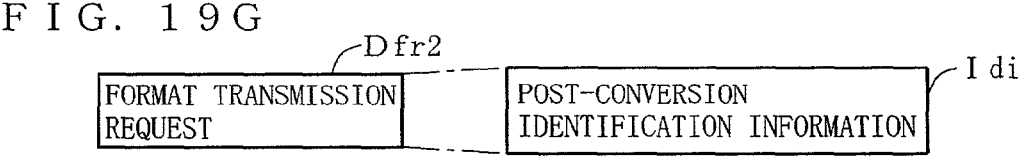

If the central processing section 12 determines that even one of the terminal apparatuses 22 and 23 is not an authorized user, the central processing section 12 sends the current license information Dlc1 back to the terminal apparatus 22 (step S313) Thereafter, the process of FIG. 17 and FIG. 18 is over. On the other hand, if it is determined at step S312 that the terminal apparatuses 22 and 23 are both authorized users, the central processing section 12 generates format transmission requests Dfr1 and Dfr2 as shown in FIG. 19F and FIG. 19G on the working area 13 (FIG. 18; step S314). Herein, the format transmission requests Dfr1 and Dfr2 are information for requesting the servers 21 and 31 identified by the pre-conversion identification information Ici and the post-conversion identification information Idi to transmit the format data Dfm1 and Dfm2.

The central processing section 12 transfers the generated format transmission requests Dfm1 and Dfm2 from the working area 13 to the communication section 14. The communication section 14 transmits the received format transmission requests Dfr1 and Dfr2 to the servers 21 and 31 via the transmission path N (step S315).

In the servers 21 and 31 (see FIG. 2 and FIG. 6), the communication sections 217 and 317 receive format transmission requests Dfr1 and Dfr2 from the transmission path N, and transfer and store them to the working areas 216 and 316 (step S316). After interpreting the stored format transmission requests Dfr1 and Dfr2, the central processing sections 215 and 315 retrieve the format data Dfm1 and Dfm2 stored in the format storage sections 218 and 318 onto the working areas 216 and 316 (step S317).

The central processing sections 215 and 315 transfer the retrieved format data Dfm1 and Dfm2 from the working areas 216 and 316 to the communication sections 217 and 317. The communication sections 217 and 317 transmit the received format data Dfm1 and Dfm2 to the conversion apparatus Uc1 via the transmission path N (step S318).

In the conversion apparatus Uc1 (see FIG. 9), the communication section 14 receives format data Dfm1 and Dfm2 from the transmission path N, and transfers and stores them to the working area 13 (step S319). Next, by referring to the format data Dfm1 and Dfm2, the central processing section 12 converts the license information Dlc1 into the license information Dlc2 (step S320).

To more specifically describe step S320, under the aforementioned assumption, the central processing section 12 recognizes by comparing the format data Dfm1 and Dfm2 that the numbers of bits employed in the usage admission information Dlw1 and the usage admission information Dlw2 differ. Therefore, the central processing section 12 extracts the usage admission information Dlw1 from the license information Dlc1, and interprets it. Thereafter, the central processing section 12 converts the extracted usage admission information Dlw1 into (q2-q1) bits of usage admission information Dlw2 which correspondings to such an interpretation result (step S321).

Furthermore, the central processing section 12 extracts the terminal identifier Itn2 from the current conversion request Dcr (step S322). Note that, as mentioned earlier, it is assumed that, both the codes and the numbers of bits are the same in the content identifiers Ict1 and Ict2 and that the decryption keys Kd1 and Kd2 are the same. Therefore, the central processing section 12 employ the content identifier Ict1 and the decryption key Kd1 in the license information Dlc1 themselves as the content identifier Ict2 and the decryption key Kd2 in the license information Dlw2.

Figure 15B:
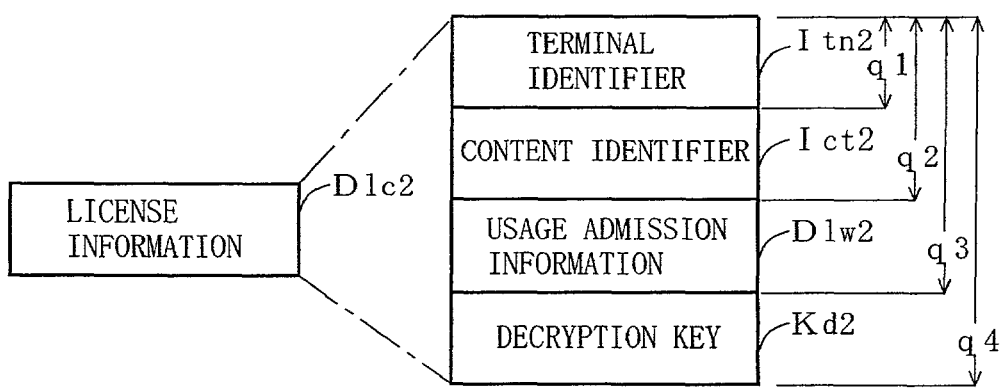
FIG. 15B is a diagram illustrating license information Dlc2, which is used by the content distribution system Scd2 in FIG. 1.

Through the above process, the terminal identifier Itn2, the content identifier Ict2, the usage admission information Dlw2, and the decryption key Kd2, which are the component elements of the license information Dlc2, become ready on the working area 13. Next, the central processing section 12 orders these component elements in accordance with the bit positions indicated in the format data Dfm2, thereby constructing the license information Dlc2 as shown in FIG. 15B (step S323). Under the aforementioned assumption, the central processing section 12 places the terminal identifier Itn2, the content identifier Ict2, the usage admission information Dlw2, and the decryption key Kd2 in this order.

Through the construct up to step S323, the license information Dlc2 having been converted from the license information Dlc1 is completed on the working area 13. Next, the central processing section 12 transfers the license information Dlc2 on the working area 13 to the communication section 14. The communication section 14 transmits the received license information Dlc2 to the terminal apparatus 22 via the transmission path N (step S324). Since the license information Dlc2 should not be utilized by a person unrelated to the subscriber β, it is preferable that the conversion apparatus Uc1 and the terminal apparatus 22 exchange the license information Dlc2 under secure communications such as SSL (Secure Socket Layer). In the terminal apparatus 22 (see FIG. 2), the communication section 222 receives the license information Dlc2 from the transmission path N (step S325)

As described above, the conversion apparatus Uc1 according to the present embodiment converts the license information Dlc1 which is compatible with the terminal apparatus 22 of the subscriber β to the license information Dlc2 which is compatible with the terminal apparatus 32 of the subscriber δ, and returns it to the terminal apparatus 22. As a result, the subscriber β can receive the license information Dlc2, which has been converted from its own license information Dlc1 and which can be properly employed at the terminal apparatus 32. The subscriber β passes the license information Dlc2 as such to the subscriber on-line or off-line. In accordance with the operation by the subscriber δ, the terminal apparatus 32 transmits a content acquisition request containing the content identifier Ict2 in the received license information Dlc2 to the server 31. The terminal apparatus 32 utilizes the resultant encrypted content data Dect2 by decrypting it with the license information Dlc2. By installing the aforementioned conversion apparatus Uc1 on the transmission path N, the problem of conventional content distribution systems can be solved and it becomes possible to easily pass one's own license information Dlc1 to others.

The above conversion processing of license information is not performed in the terminal apparatus 22, but in the conversion apparatus Uc1, which is on the transmission path N. As a result, the processing load for conversion processing at the terminal apparatus 22 can be reduced.

In the first embodiment above, through steps S35 to S312, the conversion apparatus Uc1 determines whether the terminal apparatuses 22 and 32 are authorized users or not by employing the first convertibility information Iack1 and Iack2 acquired through communications with the servers 21 and 31. However, rather than being limited to the above, the conversion apparatus Uc1 may employ first convertibility information Iack1 and Iack2 acquired from a source other than the servers 21 and 31 to make the determination at step S312, or employ first convertibility information Iack1 and Iack2 previously retained in a local auxiliary memory device to make the determination at step S312.

Second Embodiment

In the above-described first embodiment, the content data Dct1 and Dct2 having identicalness to each other are encrypted by the identical encryption keys Ke1 and Ke2. Therefore, the terminal apparatuses 22 and 32 employ identical decryption keys Kd1 and Kd2 to decrypt the encrypted content data Dect1 and Dect2. However, due to the difference in policies between the entities α and γ, different encryption schemes may be employed in the content distribution systems Scd1 and Scd2, so that the terminal apparatuses 22 and 32 may employ different decryption keys Kd1 and Kd2. In such cases, a problem may arise in that the terminal apparatus 32 cannot decrypt the encrypted content data Dect2 by employing the license information Dlc2 as converted by the conversion apparatus Uc1 according to the first embodiment. Accordingly, the second embodiment provides a conversion apparatus Uc2 which, even in the case where different encryption schemes are adopted in the content distribution systems Scd1 and Scd2, converts the license information Dlc1 for the terminal apparatus 22 into license information Dlc2 which can be properly employed by the terminal apparatus 32, thus solving the above problem.

The block structure of the conversion apparatus Uc2 is the same as the structure of the conversion apparatus Uc1 shown in FIG. 9. Moreover, the peripheral environment of the conversion apparatus Uc2 is as shown in FIG. 1. Therefore, in the conversion apparatus Uc2, any elements corresponding to those constituting the conversion apparatus Uc1 will be denoted by like numerals. Note, however, that a program Pc2 is stored in the program storage section 11 of the conversion apparatus Uc2, instead of the program Pc1.

Hereinafter, the processes by the conversion apparatus Uc2 and the terminal apparatus 22 during license conversion will be described. In the terminal apparatus 22, steps S31 and S32 in FIG. 17 are performed, whereby a conversion request Dcr and license information Dlc1 are transmitted to the conversion apparatus Uc2 via the transmission path N.

Figure 20:
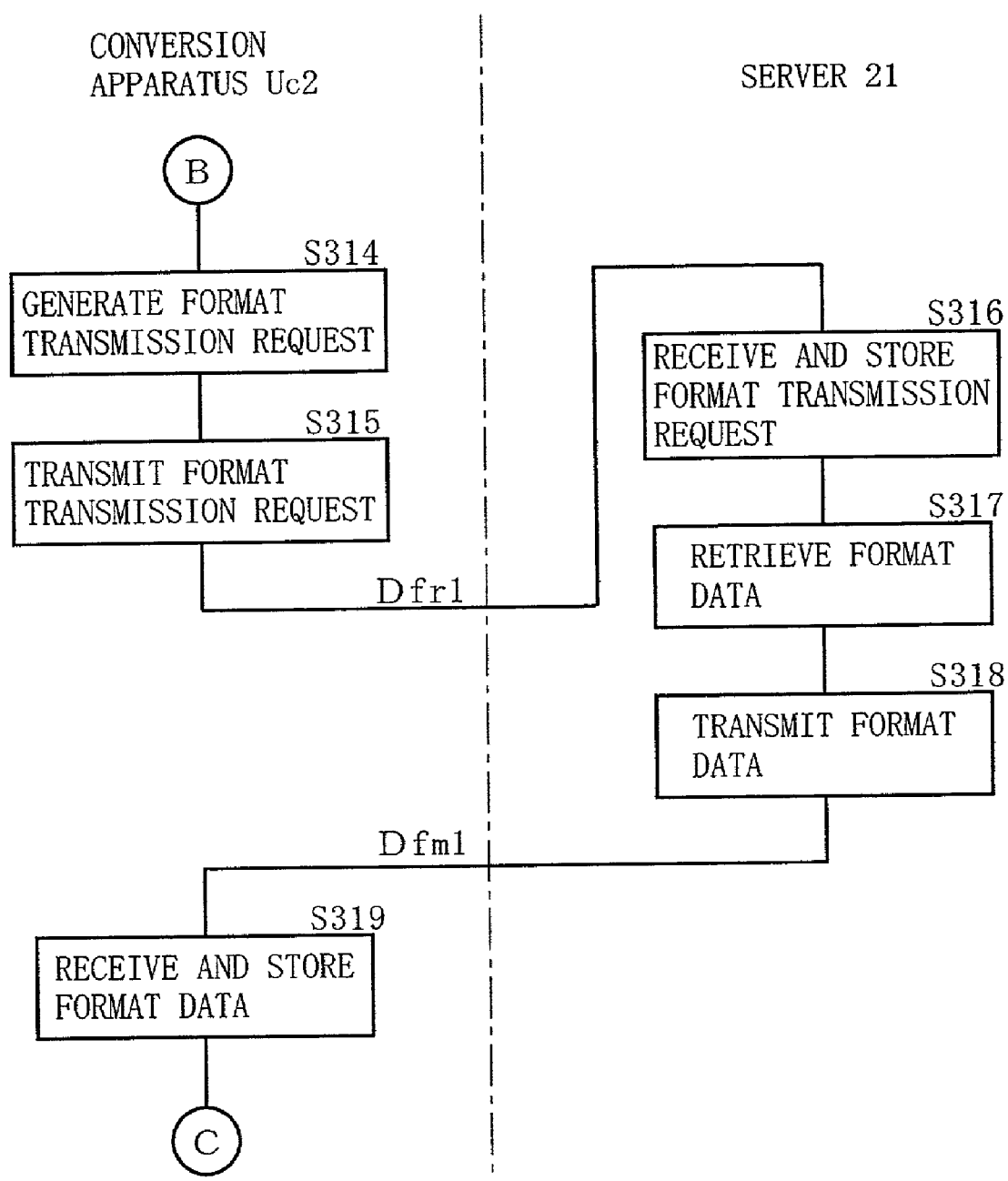
FIG. 20 is a flowchart illustrating a former half of a process which is performed by the conversion apparatus Uc2 according to the second embodiment of the present invention after receiving a conversion request Dcr, during a license conversion process.

In the conversion apparatus Uc2 (see FIG. 9), as the conversion request Dcr and the license information Dlc1 arrive via the transmission path N, the program Pc2 begins to be executed. More specifically, the central processing section 12 executes the processing procedure shown in FIG. 20 and FIG. 21 in accordance with the program Pc2. FIG. 20 and FIG. 21 partly include identical steps to those in FIG. 18. Therefore, in FIG. 20 and FIG. 21, any steps corresponding to those in the flowchart of FIG. 18 will be denoted by like step numbers, and the descriptions thereof will be simplified.

First, once the conversion request Dcr and the license information Dlc1 have arrived, after determining that the terminal apparatuses 22 and 23 are authorized users of the content distribution systems Scd1 and Scd2 at step S312 in FIG. 17, the central processing section 12 performs a process similar to steps S314 to S315 by only employing pre-conversion identification information Ici, as shown in FIG. 20, to generate a format transmission request Dfr1, which is transmitted to the server 21. As a result, only the format data Dfm1 transmitted by the server 21 is stored in the working area 13 of the conversion apparatus Uc2 (see step S316 to S319).

Furthermore, the central processing section 12 extracts a content identifier Ict1 from the current license information Dlc1 (FIG. 21; step S41). Thereafter, as shown in FIG. 22, the central processing section 12 generates a format/decryption key transmission request Dfd containing the content identifier Ict1 on the working area 13 (step S42). The format/decryption key transmission request Dfd is information for requesting the server 31 identified by the post-conversion identification information Idi to transmit the format data Dfm2 and the decryption key Kd2.

The central processing section 12 transfers the generated format/decryption key transmission request Dfd from the working area 13 to the communication section 14. The communication section 14 transmits the received format/decryption key transmission request Dfd to the server 31 via the transmission path N (step S43).

In the server 31 (see FIG. 6), the communication section 317 receives the format/decryption key transmission request Dfd from the transmission path N, and transfers and stores it to the working area 316 (step S44). After interpreting the stored format/decryption key transmission request Dfd, the central processing section 315 first retrieves the format data Dfm2 stored in the format storage section 318 onto the working area 316 (step S45).

Furthermore, the central processing section 315 looks up within the decryption key DB 312 a content identifier Ict2 having the same code as the content identifier Ict1 contained in the current format/decryption key transmission request Dfd, and reads out onto the working area 324 a decryption key Kd2 which is in the same set as the content identifier Ict2 that has been looked up (step S46). Thereafter, the central processing section 315 transfers the format data Dfm2 and the decryption key Kd2 on the working area 316 to the communication section 317, as a data set Dst2. The communication section 317 transmits the received data set Dst2 to the conversion apparatus Uc2 via the transmission path N (step S47). In the conversion apparatus Uc2 (see FIG. 9), the communication section 14 receives the data set Dst2 from the transmission path N, and transfers and stores it to the working area 13 (step S48).

Next, by referring to the format data Dfm1 and Dfm2, the central processing section 12 converts the license information Dlc1 into the license information Dlc2 (step S49)

To more specifically describe step S49, the central processing section 12 first performs step S321 as described above to convert the usage admission information Dlw1 into usage admission information Dlw2, and further performs step S322 to extract a terminal identifier Itn2. Furthermore, the central processing section 12 extracts the decryption key Kd2 from the data set Dst2 obtained at step S48 (step S410). Moreover, as described earlier, the central processing section 12 employs the content identifier Ict1 in the license information Dlc1 itself as the content identifier Ict2 in the license information Dlw2.

Through the above process, the content identifier Ict2, the usage admission information Dlw2, and the decryption key Kd2, which are the component elements of the license information Dlc2, become ready on the working area 13. Next, the central processing section 12 constructs the license information Dlc2 as shown in FIG. 15B (step S411). Through steps S410 and S411, the decryption key Kd1 in the license information Dlc1 is replaced by the decryption key Kd2. Next, the central processing section 12 executes step S324 to transmit the constructed license information Dlc2 to the terminal apparatus 22, via the communication section 14 and the transmission path N. In the terminal apparatus 22 (see FIG. 2), the communication section 222 executes step S325 to receive the license information Dlc2 from the transmission path N.

As described above, as does the conversion apparatus Uc1, the conversion apparatus Uc2 according to the present embodiment returns the license information Dlc2 which is compatible with the terminal apparatus 32 to the terminal apparatus 22. In particular, the conversion apparatus Uc2 employs the content identifier Ict1 in the license information Dlc1 to obtain the decryption key Kd2 allocated to the corresponding content identifier Ict2 through data communications with the server 32. The conversion apparatus Uc2 sets the obtained decryption key Kd2 in the license information Dlc2. As a result, there is provided a conversion apparatus Uc2 which, even in the case where different encryption schemes are adopted in the content distribution systems Scd1 and Scd2, converts the license information Dlc1 for the terminal apparatus 22 into license information Dlc2 which can be properly employed by the terminal apparatus 32.

In the second embodiment above, the conversion apparatus Uc2 acquires the decryption key Kd2 through communications with the server 31 at steps S47 and S48. However, rather than being limited to the above, the conversion apparatus Uc2 may generate the license information Dlc2 by employing a decryption key Kd2 which is acquired from other than the server 31, or generate the license information Dlc2 by employing a decryption key Kd2 previously retained in a local auxiliary memory device.

Third Embodiment

In the previous embodiments, both conversion apparatuses Uc1 and Uc2 performs conversion processing for license information unconditionally in response to a conversion request Dcr from the terminal apparatus 22. However, depending on the policies of the entity α, there may be a usage rule Cct1 which is desired to be exempted from license information conversion processing. Accordingly, the third embodiment provides a conversion apparatus Uc3 which can restrict the conversion processing of license information.

The conversion apparatus Uc3 has a block structure similar to the structure of conversion apparatus Uc1 shown in FIG. 9. Moreover, the peripheral environment of the conversion apparatus Uc3 is as shown in FIG. 1. Therefore, in the conversion apparatus Uc3, any elements corresponding to those constituting the conversion apparatus Uc1 will be denoted by like numerals. Note, however, that a program Pc3 is stored in the program storage section 11 of the conversion apparatus Uc3, instead of the program Pc1.

Figure 23A:
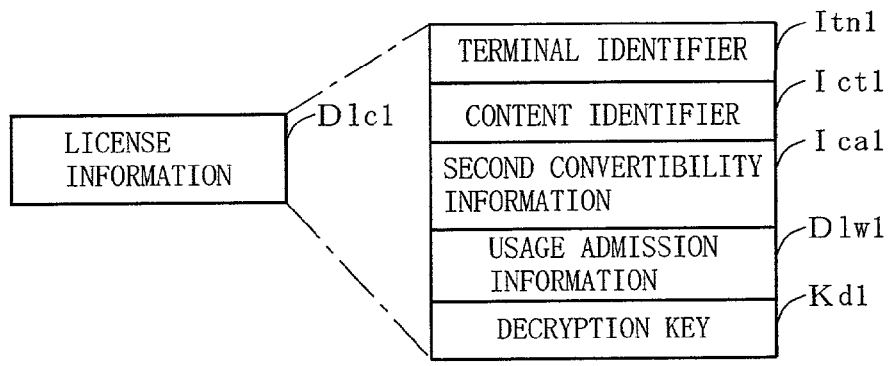
FIG. 23A to FIG. 23C are diagrams illustrating license information Dlc1 which is to be converted in the third embodiment.

Hereinafter, the processes by the conversion apparatus Uc3 and the terminal apparatus 22 during license conversion will be described. At the terminal apparatus 22, steps S31 and S32 in FIG. 17 are performed, whereby a conversion request Dcr and license information Dlc1 are transmitted to the conversion apparatus Uc3 via the transmission path N. In the present embodiment, the license information Dlc1 differs from that shown in FIG. 14B in that second convertibility information Ica1 is allocated as shown in FIG. 23A. Otherwise, there are no differences in the license information Dlc1. Therefore, in FIG. 23A, any information shown in FIG. 14B is denoted by like numerals, and the descriptions thereof are omitted. The second convertibility information Ica1, which is allocated based on the policies of the entity α, is information indicating whether or not to approve of conversion processing for the usage admission information Dlw1 contained in the same license information Dlc1.

Figure 23B:
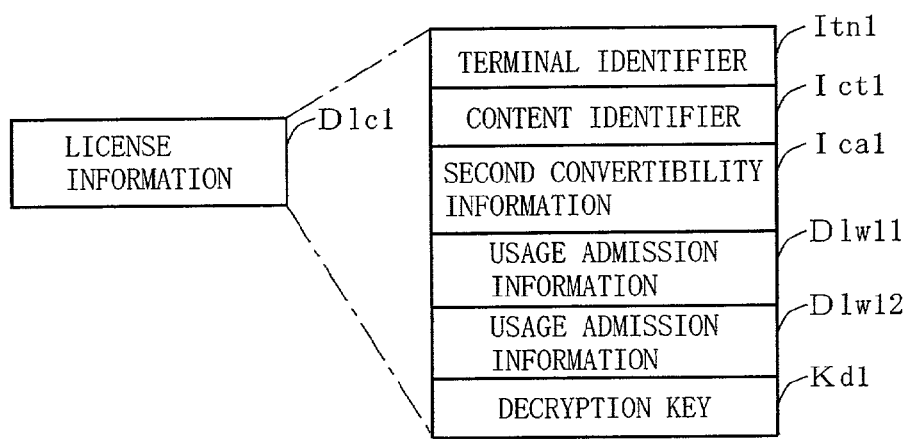
Figure 23C:
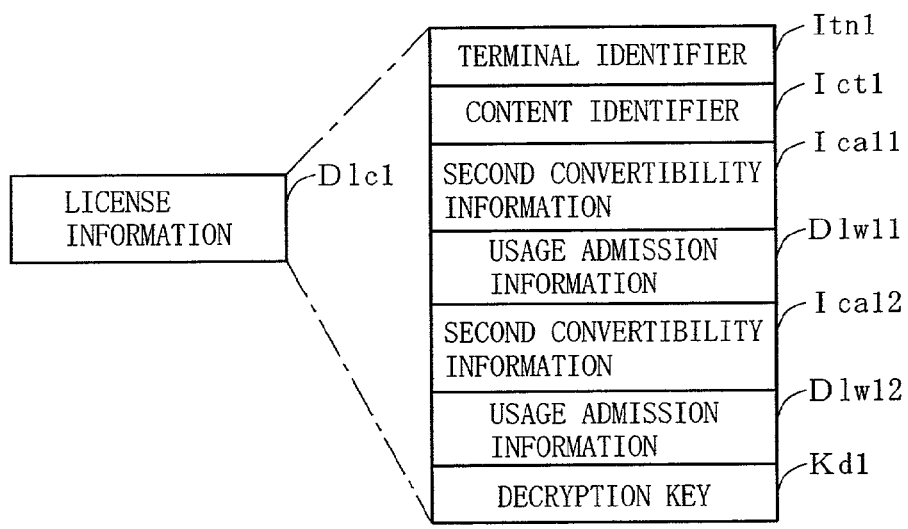

Next, referring to FIG. 23B and FIG. 23C, two specific examples of second convertibility information Ica1 will be described. First, in FIG. 23B, the license information Dlc1 contains a terminal identifier Itn1, a content identifier Ict1, second convertibility information Ica1, usage admission information Dlw11 and Dlw12 as an exemplary plurality of usage admission information Dlw1, and a decryption key Kd1. The usage admission information Dlw11 represents a number of times of reproduction, for example. The usage admission information Dlw12 represents a number of times of printing, for example. The second convertibility information Ica1 indicates whether or not to approve of conversion processing for all such usage admission information Dlw11 and Dlw12. In FIG. 23C, the license information Dlc1 contains a terminal identifier Itn1, a content identifier Ict1, second convertibility information Ica11 and usage admission information Dlw11 and second convertibility information Ica12 and usage admission information Dlw12 as an exemplary set of one or more second convertibility information Ica1 and usage admission information Dlw1, and a decryption key Kd1. As described above, the usage admission information Dlw11 and Dlw12 indicates a number of times of reproduction and a number of times of printing, for example. The second convertibility information Ica11 indicates whether or not to approve of conversion processing for the usage admission information Dlw11 in the same set. The second convertibility information Ica12 indicates whether or not to approve of conversion processing for the usage admission information Dlw12 in the same set.

Figure 24:
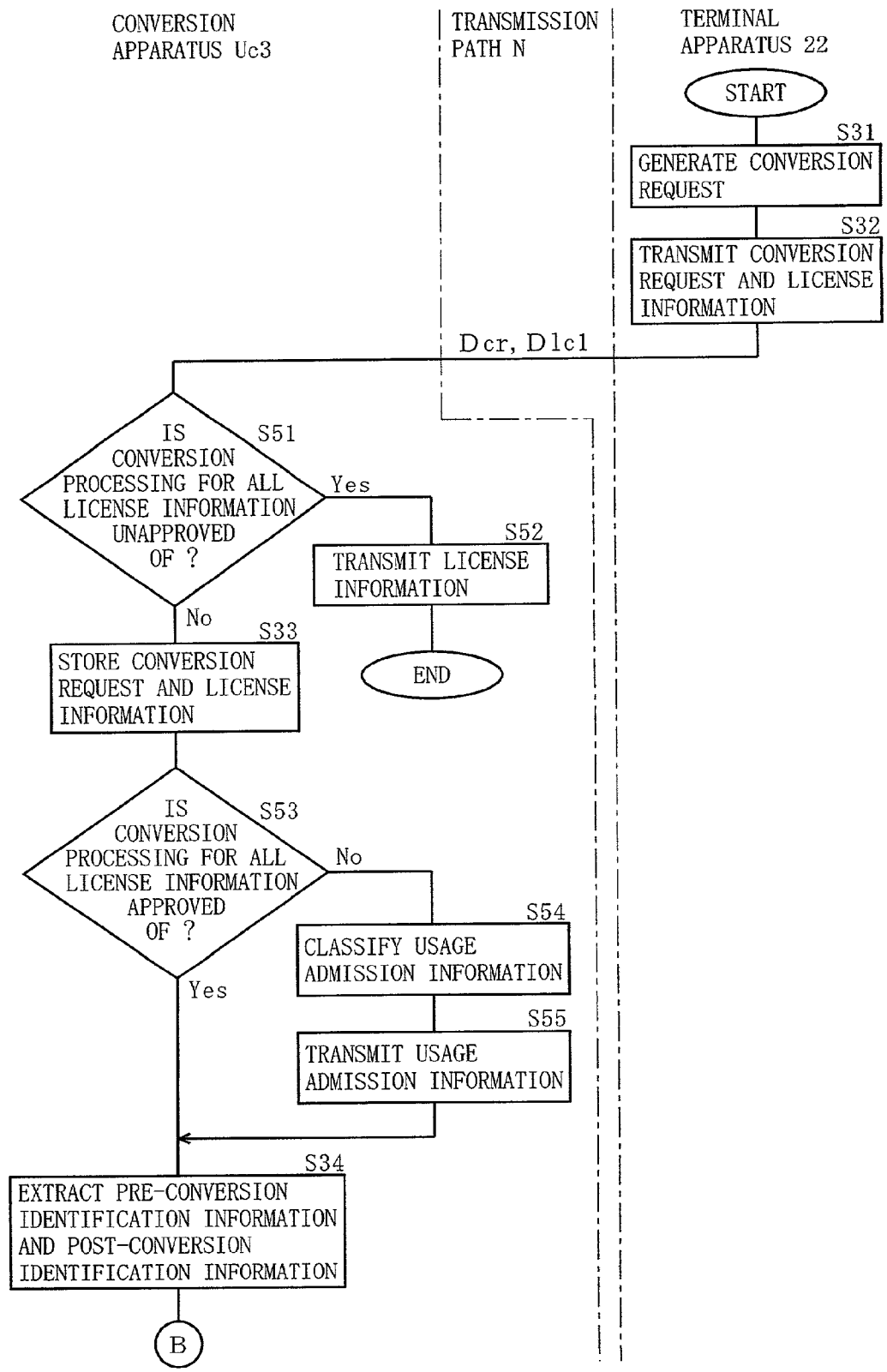
FIG. 24 is a flowchart illustrating a former half of a process which is performed by the conversion apparatus Uc3 according to the third embodiment of the present invention after receiving a conversion request Dcr, during a license conversion process.

In the conversion apparatus Uc3 (see FIG. 9), as the conversion request Dcr and license information Dlc1 from the terminal apparatus 22 arrive via the transmission path N, the program Pc3 begins to be executed. More specifically, the central processing section 12 executes a processing procedure shown in FIG. 24 in accordance with the program Pc3. FIG. 24 partly include identical steps to those in FIG. 17. Therefore, in FIG. 24, any steps corresponding to those in the flowchart of FIG. 17 will be denoted by like step numbers, and the descriptions thereof will be simplified.

First, after the conversion request Dcr and the license information Dlc1 have arrived, the central processing section 12 checks the second convertibility information Ica1 to determine whether conversion processing for all usage admission information Dlw1 is unapproved of (step S51). If conversion processing for all usage admission information Dlw1 is unapproved of, the central processing section 12 sends the current received license information Dlc1 back to the terminal apparatus 22 (step S52), and the process of FIG. 24 is over. Alternatively, the conversion apparatus Uc3 may perform steps S35 and S36 (see FIG. 17) before step S51 to acquire first convertibility information Iack1 and Iack2 from the servers 21 and 31, and thereafter determine whether or not the terminal apparatuses 22 and 32 are authorized users of the content distribution systems Scd1 and Scd2, and then perform step S51.

On the other hand, if it is determined at step S51 that conversion processing for some or all of the usage admission information Dlw1 is approved of, the central processing section 12 stores the conversion request Dcr and the license information Dlc1 as described in the first embodiment (step S33). Thereafter, in accordance with the second convertibility information Ica1, the central processing section 12 determines whether or not conversion of all usage admission information Dlw1 is approved of (step S53). If conversion of all usage admission information Dlc1 is approved of, central the processing section 12 performs the process from steps S34 to S316 (see FIG. 18).

On the other hand, if it is determined at step S53 that conversion processing for some of the usage admission information Dlw1 is approved of, the central processing section 12 classifies the usage admission information Dlw1 into those for which conversion processing is approved of and those for which conversion processing is not approved of, in accordance with the second convertibility information Ica1 (step S54). Thereafter, the central processing section 12 sends those usage admission information Dlw1 for which conversion processing is not approved of, back to the terminal apparatus 22 (step S55). Thereafter, the process from steps S34 to S316 (see FIG. 18) is performed for those usage admission information Dlw1 for which conversion processing is approved of.

Through the above process, the conversion apparatus Uc3 according to the present embodiment employs the second convertibility information Ica1, thereby making it possible to restrict the conversion processing for license information. Thus, the resultant conversion apparatus Uc3 can reflect the policies of the entity $\alpha$.

The third embodiment illustrates that the second convertibility information Ica1 is allocated in license information Dlc1. However, the second convertibility information Ica1 does not need to be allocated in the license information Dlc1. In this case, after the conversion request Dcr and the license information Dlc1 have arrived, for example, the conversion apparatus Uc3 may typically inquire the server 31 to acquire the second convertibility information Ica1 corresponding to each piece of usage admission information Dlw1, and thereafter perform the process from step S51. Alternatively, for each piece of usage admission information Dlw1 used in the content distribution system Scd1, the conversion apparatus Uc3 may have second convertibility information Ica1 previously retained in a local auxiliary memory device, and after the arrival of the conversion request Dcr and the license information Dlc1, perform the process from step S51 by employing the local second convertibility information Ica1.

In the third embodiment, the central processing section 12 classifies the usage admission information Dlw1 into those for which conversion processing is approved of and those for which conversion processing is not approved of at step S54. As a result, there may only be a single piece of usage admission information Dlw1 left to be subjected to the process from step S34. Furthermore, in some cases, such usage admission information Dlw1 is meaningless when it is by itself. For example, in the case where the usage admission information Dlw1 indicates permission of replication of the content data Dect1, even if the terminal apparatus 23 acquires the license information Dlc2 after conversion, the terminal apparatus 22 can merely replicate the content data Dect1, without being able to reproduce or print the content data Dect1. In other words, such license information Dlc2 is meaningless by itself. In order to avoid execution of conversion processing for such meaningless license information, it is preferable that the central processing section 12 examines the substance usage admission information Dlw1 left in step S54 to determine whether or not it is meaningful, and ensures that those which is meaningless will not be the subject of the process from step S34.

In the third embodiment, the central processing section 12 sends those usage admission information Dlw1 for which conversion processing is not approved of, back to the terminal apparatus 22 at steps S52 and S55. Rather than being limited to the above, if the usage admission information Dlw1 which is set in the license information Dlc1 is not defined as usage admission information in the content distribution system Scd2, the central processing section 12 may determine that conversion processing therefor is not approved of, and send the usage admission information Dlw1 back to the terminal apparatus 22 at step S55. Alternatively, even when the above determination is made, the conversion apparatus Uc3 may retain unconvertible license information Dlw1 in a local or remote auxiliary memory device or return it to the server 31.

In the first to third embodiments, the conversion apparatuses Uc1 to Uc3 are employed for the subscriber $\beta$ to pass his/her own license information Dlc1 to the subscriber $\delta$. However, the conversion apparatuses Uc1 to Uc3 are applicable in other situations, e.g., where the subscriber $\beta$ has somehow obtained the license information Dlc2 which can be employed in the second content distribution system Scd2, and converts the obtained license information Dlc2 into license information Dlc1 which is usable in the content distribution system Scd1 to which he/she subscribes. The conversion apparatuses Uc1 to Uc3 are also applicable in the case of converting the obtained license information Dlc2 to that which is usable in another content distribution system to which one is not subscribing.

In the above first to third embodiments, the conversion apparatuses Uc1 to Uc3 return license information Dlc2 after conversion to the terminal apparatus 22 at step S314 (see FIG. 18, FIG. 21). However, rather than being limited to the above, the terminal apparatus 22 transmits information which uniquely identifies the terminal apparatus 32 serving as a recipient of the passing of the license information Dlc2, together with the conversion request Dcr, to the conversion apparatuses Uc1 to Uc3. Furthermore, based on the received information, the conversion apparatuses Uc1 to Uc3 may transmit the license information Dlc2 after conversion to the terminal apparatus 32. Generically speaking, the license information Dlc2 after conversion may come to the terminal apparatus 32 by any method.

In the first embodiment, the conversion apparatus Uc1 performs conversion processing for license information. Alternatively, a program composed of the process from steps S314 to S323 (see FIG. 18) may be stored in the terminal apparatus 22. In the second embodiment, the conversion apparatus Uc2 performs conversion processing for license information. Alternatively, a program composed of the process from steps S314 to S411 (see FIG. 20 and FIG. 21) may be stored in the terminal apparatus 22. In the third embodiment, the conversion apparatus Uc3 performs conversion processing for license information. Alternatively, the terminal apparatus 22 may be arranged so as to perform the process from step S51 (see FIG. 24). As a result, the terminal apparatus 22 itself can convert license information Dlc1 which is compatible with itself into license information Dlc2 which is compatible with the terminal apparatus 32. Thus, since the terminal apparatus 22 does not need to perform data communications with the conversion apparatuses Uc1 to Uc3, it becomes possible to reduce communication costs and the like, and to quickly obtain the license information Dlc2 which is compatible with the terminal apparatus 32.

In the first to third embodiments, the conversion apparatuses Uc1 to Uc3 convert license information Dlc1 which is issued for the terminal apparatus 22 into license information Dlc2 so that it can be utilized at the terminal apparatus 23. However, rather than being limited to the above, the conversion apparatuses Uc1 to Uc3 may convert, for example, license information Drgt1 (see FIG. 5) which is assigned to the subscriber β, and generate license information Drgt2 for another subscriber δ. In other words, the license information Dlc1 is not limited to those described in the first to third embodiments, but also includes the license information Drgt1 shown in FIG. 5. As a typical process in this case, the conversion apparatuses Uc1 to Uc3 convert an identifier (not shown in FIG. 5) which is set in the license information Drgt1 for identifying the subscriber β into an identifier for identifying the subscriber δ.

In the first to third embodiments above, adjustment of the number of bits in the usage admission information Dlw1 and Dlw2 is illustrated as conversion processing for license information. However, rather than being limited to this, the license information Dlc1 and Dlc2 may be generated with different character sets, for example. In this case, the conversion apparatuses Uc1 to Uc3 communicate with both servers 21 and 31 to confirm what sort of character sets are employed in the content distribution systems Scd1 and Scd2. Based on the result of such confirmation, the conversion apparatuses Uc1 to Uc3 may convert the character set of license information Dlc1 into that of license information Dlc2. In another case where a table describing what sort of character sets are employed in the content distribution systems Scd1 and Scd2 is previously retained, the conversion apparatuses Uc1 to Uc3 may refer to such a table and convert the character set of license information Dlc1 into that of license information Dlc2.

Moreover, the license information Dlc1 and Dlc2 may be described in a description language such as XML (eXtensible Markup Language) or XrML (extensible rights Markup Language). In this case, the conversion apparatuses Uc1 to Uc3 may convert tag values in XML or XrML, or convert the description language itself, thereby carrying out conversion processing from license information Dlc1 to Dlc2.

In another case, the license information Dlc1 and Dlc2 may have different component elements. A typical example is where the license information Dlc1 includes usage admission information Dlw1 but the license information Dlc2 does not include any corresponding usage admission information Dlw2. In such a case, too, the conversion apparatuses Uc1 to Uc3 communicate with both servers 21 and 31 to confirm what component elements the license information Dlc1 and Dlc2 are composed of in the content distribution systems Scd1 and Scd2. Based on the result of such confirmation, the conversion apparatuses Uc1 to Uc3 may perform conversion processing so that the component elements of the license information Dlc1 match those of the license information Dlc2. In another case where a table describing what sort of component elements the license information Dlc1 and Dlc2 are composed of in the content distribution systems Scd1 and Scd2 is previously retained, the conversion apparatuses Uc1 to Uc3 may refer to such a table and perform conversion processing so that the component elements of the license information Dlc1 match those of the license information Dlc2.

In another case, the license information Dlc1 and Dlc2 may have the same component elements, but the component elements in the license information Dlc1 and Dlc2 may be in different arrangements. In such cases, too, the conversion apparatuses Uc1 to Uc3 communicate with both servers 21 and 31 to confirm what sort of arrangement of component elements the license information Dlc1 and Dlc2 are composed of in the content distribution systems Scd1 and Scd2. Based on the result of such confirmation, the conversion apparatuses Uc1 to Uc3 may perform conversion processing so that the component element arrangement of the license information Dlc1 matches that of the license information Dlc2. In another case where a table describing what sort of arrangement of component elements the license information Dlc1 and Dlc2 are composed of in the content distribution systems Scd1 and Scd2 is previously retained, the conversion apparatuses Uc1 to Uc3 may refer to such a table and perform conversion processing so that the component element arrangement of the license information Dlc1 matches that of the license information Dlc2.

In the descriptions of the first to third embodiments, it is assumed that content identifiers Ict1 and Ict2 having the same code are assigned to content data Dct1 and Dct2 having identicalness. However, rather than being limited to the above, content identifiers Ict1 and Ict2 having unique codes may be assigned to content data Dct1 and Dct2 having identicalness in the content distribution systems Scd1 and Scd2. However, in this case, the conversion apparatuses Uc1 to Uc3 need to convert the content identifier Ict1 contained in the license information Dlc1 into the content identifier Ict2. Therefore, it is preferable that the conversion apparatuses Uc1 to Uc3 previously retain a table describing correspondence between the content identifiers Ict1 and Ict2 which are assigned to the content data Dct1 and Dct2 having identicalness in the content distribution systems Scd1 and Scd2. The conversion apparatuses Uc1 to Uc3 refer to such a table and convert the content identifier Ict1 contained in the license information Dlc1 to the content identifier Ict2.

In the first to third embodiments, the conversion apparatuses Uc1 to Uc3 receive from the terminal apparatus 22 the license information Dlc1 to be subjected to conversion processing. However, rather than being limited to the above, the conversion apparatuses Uc1 to Uc3 may perform data communications with the server 21 to acquire license information Dlc1 which is compatible with the terminal apparatus 22.

In the first to third embodiments, the server 21 transmits the content data Dct1 and the license information Dlc1 to the terminal apparatus 22 at different times. However, rather than being limited to the above, the server 21 may embed the license information Dlc1 in the content data Dct1 as an electronic watermark, and transmit the content data Dct1 to the terminal apparatus 22 at the same time. This also applies to the server 31.

In the first to third embodiments, the conversion apparatuses Uc1 to Uc3 acquire the format data Dfm1 and Dfm2 from the servers 21 and 31 through communications (step S315 to S319) As a result, the conversion apparatuses Uc1 to Uc3 do not need to constantly retain the format data Dfm1 and Dfm2 in an auxiliary memory device. However, rather than being limited to acquisition through communications, the conversion apparatuses Uc1 to Uc3 may retain the format data Dfm1 and Dfm2 in a local auxiliary memory device. As a result, the conversion apparatuses Uc1 to Uc3 do not need to perform communications with the servers 21 and 31, so that it becomes possible to quickly perform conversion processing for license information.

In the first to third embodiments, the conversion apparatuses Uc1 to Uc3 convert the format of license information Dlc1 into that of license information Dlc2, as an example of conversion processing for license information (step S320). More specifically, the number of times of reproduction as a usage rule Cct1 is set to be one time in the usage admission information Dlw1, and the conversion apparatuses Uc1 to Uc3 convert such usage admission information Dlw1 into usage admission information Dlw2 in which the number of times of reproduction is set to be one time. However, rather than being limited to such format conversion, the conversion apparatuses Uc1 to Uc3 may alter the usage rule Cct1 itself which is contained in the license information Dlc1, and generate license information Dlc2 containing a different usage rule Cct2. More specifically, the conversion apparatus Uc1 employs a conversion ratio between usage rules Cct1 and Cct2 to alter the usage rule Cct1 in the license information Dlc1 into the usage rule Cct2. As a result, for example, a number of times of reproduction n1 as the usage rule Cct1 is altered to a number of times of reproduction n2 as the usage rule Cct2. In another exemplary case where the content data Dct1 represents a still image, a number of times of reproduction n1 as the usage rule Cct1 is altered to a number of times of printing n2 as the usage rule Cct2. Furthermore, a valid period as the usage rule Cct1 is altered to an indefinite usage period as the usage rule Cct2. Moreover, the conversion apparatuses Uc1 to Uc3 may externally acquire a conversion ratio, as with the format data Dfm1 and the like, or locally retain it.

In the first to third embodiments above, the programs Pc1 to Pc3 are stored in the conversion apparatuses Uc1 to Uc3. However, rather than being limited to the above, the programs Pc1 to Pc3 may be provided in a recorded form on a recording medium such as a CD-ROM, or distributed via the transmission path N.

In the first to third embodiments above, anti-tampering techniques may be introduced in any portions in the conversion apparatuses Uc1 to Uc3, the servers 21 and 31, and the terminal apparatuses 22 and 32 as necessary. Moreover, information which is necessary for detecting alterations, such as hash, may be allocated in at least the usage admission information Dlw1.

While the invention has been described in detail, the foregoing description is in all aspects illustrative and not restrictive. It is understood that numerous other modifications and variations can be devised without departing from the scope of the invention.

What is claimed is:

1. A device for converting first license information for a first system into second license information for a second system which is different from the first system, the first license information including at least two pieces of usage permission information for permitting use of content data, the device comprising:
   a storing unit operable to store conversion-permission information, the conversion-permission information indicating at least one piece of the usage permission information included in the first license information which is not given permission to be converted into the second license information; and
   a converting unit operable to convert information contained in the first license information, except the at least one piece of the usage permission information which is not given the permission in the conversion-permission information, into the second license information.

2. A method for converting first license information for a first system into second license information for a second system which is different from the first system, the first license information including at least two pieces of usage permission information for permitting use of content data, the method comprising:
   storing conversion-permission information, the conversion-permission information indicating at least one piece of the usage permission information included in the first license information which is not given permission to be converted into the second license information; and
   converting information contained in the first license information, except the at least one piece of usage permission information which is not given the permission in the conversion-permission information, into the second license information.

3. A program recorded on a recordable medium for causing a device to convert first license information for a first system into second license information for a second system which is different from the first system, the first license information including at least two pieces of usage permission information for permitting use of content data, the program causing the device to execute:
   storing conversion-permission information in the device, the conversion-permission information indicating at least one piece of the usage permission information included in the first license information which is not given permission to be converted into the second license information; and
   converting information contained in the first license information, except the at least one piece of usage permission information which is not given the permission in the conversion-permission information, into the second license information.

4. A device for converting first license information for a first system into second license information for a second system which is different from the first system, the device comprising:
   a storing unit operable to store conversion-permission information, the conversion-permission information indicating, for at least one piece of usage permission information included in the first license information which includes at least two pieces of usage permission information for permitting use of content data, whether or not the at least one piece of the usage permission information is given permission to be converted into the second license information; and
   a converting unit operable to convert information contained in the first license information, except a piece of the usage permission information which is not given permission to be converted in the conversion-permission information, into the second license information.

5. A method for converting first license information for a first system into second license information for a second system which is different from the first system, the method comprising:
   storing conversion-permission information, the conversion-permission information indicating, for at least one piece of usage permission information included in the first license information which includes at least two pieces of usage permission information for permitting use of content data, whether or not the at least one piece of the usage permission information is given permission to be converted into the second license information; and
   converting information contained in the first license information, except a piece of the usage permission information which is not given permission to be converted in the conversion-permission information, into the second license information.

6. A program recorded on a recordable medium for causing a device to convert first license information for a first system into second license information for a second system which is different from the first system, the program causing the device to execute:

storing conversion-permission information in the device, the conversion-permission information indicating, for at least one piece of usage permission information included in the first license information which includes at least two pieces of usage permission information for permitting use of content data, whether or not the at least one piece of the usage permission information is given permission to be converted into the second license information; and converting information contained in the first license information, except a piece of the usage permission information which is not given permission to be converted in the conversion-permission information, into the second license information.

* * * * *